United States Patent [19]
Higashimata et al.

[11] Patent Number: 5,959,572
[45] Date of Patent: Sep. 28, 1999

[54] VEHICLE FOLLOW-UP CONTROL APPARATUS

[75] Inventors: Akira Higashimata, Kanagawa; Ken Itou, Tokyo, both of Japan

[73] Assignee: Nissan Motor Co., Ltd., Kanagawa, Japan

[21] Appl. No.: 09/049,100

[22] Filed: Mar. 27, 1998

[30] Foreign Application Priority Data

Mar. 31, 1997 [JP] Japan .................................... 9-079947
Aug. 27, 1997 [JP] Japan .................................... 9-230651

[51] Int. Cl.$^6$ ........................................................ G01S 13/93
[52] U.S. Cl. ................................ 342/70; 342/71; 342/72; 340/903
[58] Field of Search ................................ 342/70, 71, 72; 340/903

[56] References Cited

U.S. PATENT DOCUMENTS

| | | | |
|---|---|---|---|
| 3,725,921 | 4/1973 | Weidman et al. | 342/71 |
| 3,952,301 | 4/1976 | Sorkin | 342/71 |
| 4,414,548 | 11/1983 | Carpenter et al. | 342/117 |
| 5,334,983 | 8/1994 | Ikeda et al. | 342/70 |
| 5,574,463 | 11/1996 | Shirai et al. | 342/70 |
| 5,646,843 | 7/1997 | Gudat et al. | 701/3 |
| 5,680,313 | 10/1997 | Whittaker et al. | 701/300 |

FOREIGN PATENT DOCUMENTS 6-227280  8/1994  Japan .

*Primary Examiner*—John B. Sotomayor
*Attorney, Agent, or Firm*—McDermott, Will & Emery

[57] ABSTRACT

A preceding-vehicle follow-up control apparatus is arranged to calculate a target vehicle speed for following-up a preceding vehicle at a target vehicle-to-vehicle distance. The target vehicle speed is calculated from an equation having a form of a linear combination of a form which includes a linear connection between a product of a first gain and a difference between the vehicle-to-vehicle distance and the target vehicle-to-vehicle distance and a product of a second gain and the relative speed. The control apparatus controls a driving apparatus and a transmission apparatus of a vehicle so as to adjust a vehicle speed at the target vehicle speed. This enables the vehicle-to-vehicle distance to be converged into a target value without excessively increasing or decreasing the relative speed during this follow-up control.

15 Claims, 20 Drawing Sheets

VEHICLE FOLLOW-UP CONTROL APPARATUS

The contents of Applications Nos. P9-79947 and P9-230651, with filing dates Mar. 31 and Aug. 27, 1997 in Japan, are hereby incorporated by reference.

BACKGROUND OF THE INVENTION

Japanese Patent Provisional Publication No. 6-227280 has proposed a preceding vehicle follow-up control apparatus which controls a vehicle speed V at a target vehicle speed Vt. The target vehicle speed Vt for keeping a vehicle-to-vehicle distance to a preceding vehicle at a target distance is calculated on the basis of the vehicle speed V, a difference $\Delta R$ between the detection value of the vehicle-to-vehicle distance and the target distance, a gain Gv which is a function of the vehicle speed V, a gain Gr which is a function of the distance difference $\Delta R$ and a gain Gd which is a function of a relative speed $\Delta V$ from the following equation.

$$Vt = Gv \cdot V + Gr \cdot \Delta R + Gd \cdot \Delta R$$

However, since this conventional preceding vehicle follow-up control apparatus is basically arranged to construct a control system for converging the vehicle-to-vehicle distance to the target distance, it is possible that a relative speed between the vehicles will become too high or too low during the control of the vehicle-to-vehicle distance to the target vehicular distance although the relative speed becomes 0 by the convergence of the vehicle-to-vehicle distance to the target distance. Further, since the conventional preceding vehicle follow-up apparatus is arranged to calculate the target vehicle speed of a controlled vehicle by using a plurality of gains as shown in the above equation, the following problems will occur.

(1) Since these gains are determined experimentally, the steps for tuning thereof becomes large, and the gains become different according to the liking of staffs and a difference of ability among individuals.

(2) Since each gain is stored in the form of an equation or table, a required storage capacity of a memory is increased and the load for calculation processing of a microcomputer is increased.

(3) Since a nonlinear control system, which employs the gain Gd as to the relative speed $\Delta V$ and the vehicular distance $\Delta R$ in the form of product therebetween, is applied, it is not certain that this control system can preferably converge all follow-up cruising conditions.

SUMMARY OF THE INVENTION

It is an object of the present invention to provide a preceding vehicle follow-up control apparatus which is arranged to converge a vehicle-to-vehicle distance to a target vehicular distance so as to prevent the relative speed from becoming too high or too low during a follow-up control.

Another object of the present invention is to provide a preceding vehicle follow-up control apparatus which performs an optimum response characteristic even in any condition.

A preceding-vehicle follow-up control apparatus according to the present invention is for a vehicle and comprises a vehicle speed detecting section, a vehicle-to-vehicle distance detecting section, a relative speed detecting section, a target speed calculating section and a vehicle speed control section. The vehicle speed detecting section detects a vehicle speed of the controlled vehicle. The vehicle-to-vehicle-distance detecting section detects a vehicle-to-vehicle distance between the controlled vehicle and a preceding vehicle cruising ahead of the controlled vehicle. The relative speed detecting section obtains a relative speed between the controlled vehicle and the preceding vehicle. The target speed calculating section calculates a target vehicle speed which is employed to adjust the vehicle-to-vehicle distance at a target vehicle-to-vehicle distance. The target speed calculating section calculates the target vehicle speed by employing a form which includes a linear connection between a product of a first gain and a difference between the vehicle-to-vehicle distance and the target vehicle-to-vehicle distance and a product of a second gain and the relative speed. The vehicle speed control section controls driving power of the controlled vehicle to adjust the detected vehicle speed to the target vehicle speed.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 15D, there is shown a first embodiment of a preceding vehicle follow-up control apparatus according to the present invention.

Figure 1:
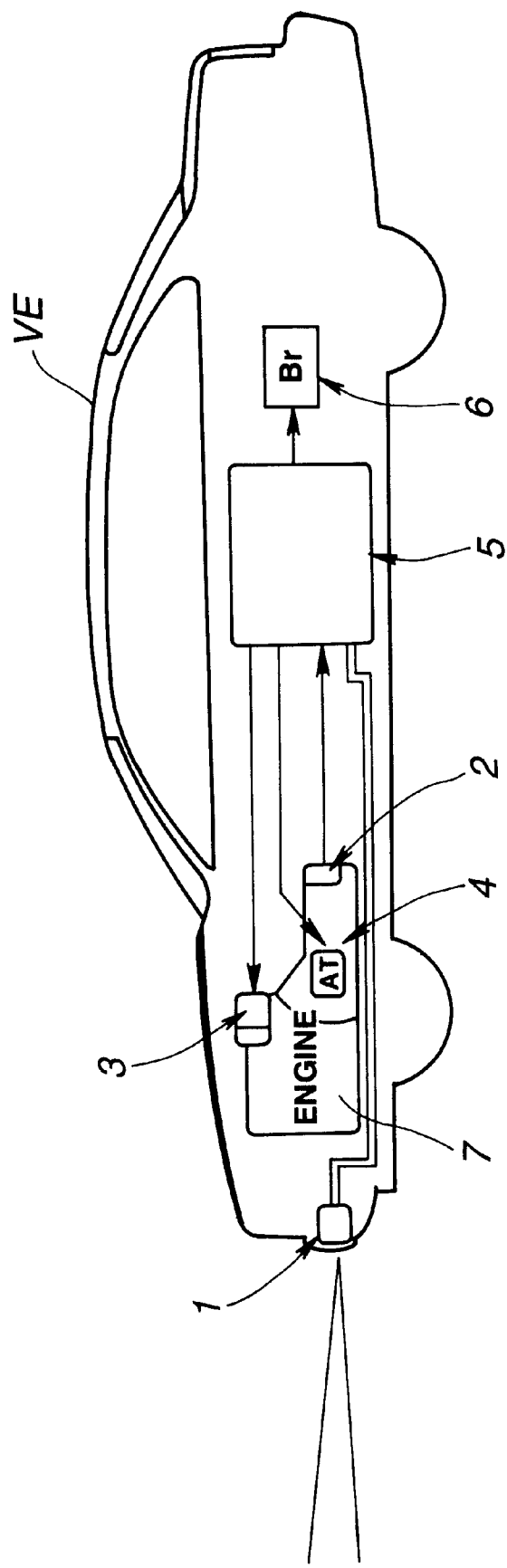
FIG. 1 is a schematic view showing a construction of a first embodiment of a preceding vehicle follow-up control apparatus according to the present invention.

As shown in FIG. 1, the preceding vehicle follow-up control apparatus according to the present invention comprises a vehicle-to-vehicle distance sensor head 1 of a radar type which outputs laser beam and receives a reflected light from a preceding vehicle. A vehicle speed sensor 2 is installed at an output shaft of an automatic transmission 4 and outputs a pulse train having a cycle indicative of a vehicle speed V according to the rotation speed thereof. A throttle actuator 3 opens and closes a throttle valve 7A of an engine 7 according to the throttle valve opening signal to control the engine output by changing intake air amount of the engine 7. The automatic transmission 4 is arranged to change its gear ratio according to the vehicle speed V and a throttle valve opening Tvo. The braking apparatus 6 for generating braking force at the vehicle VE is controlled by a follow-up controller 5.

Figure 2:
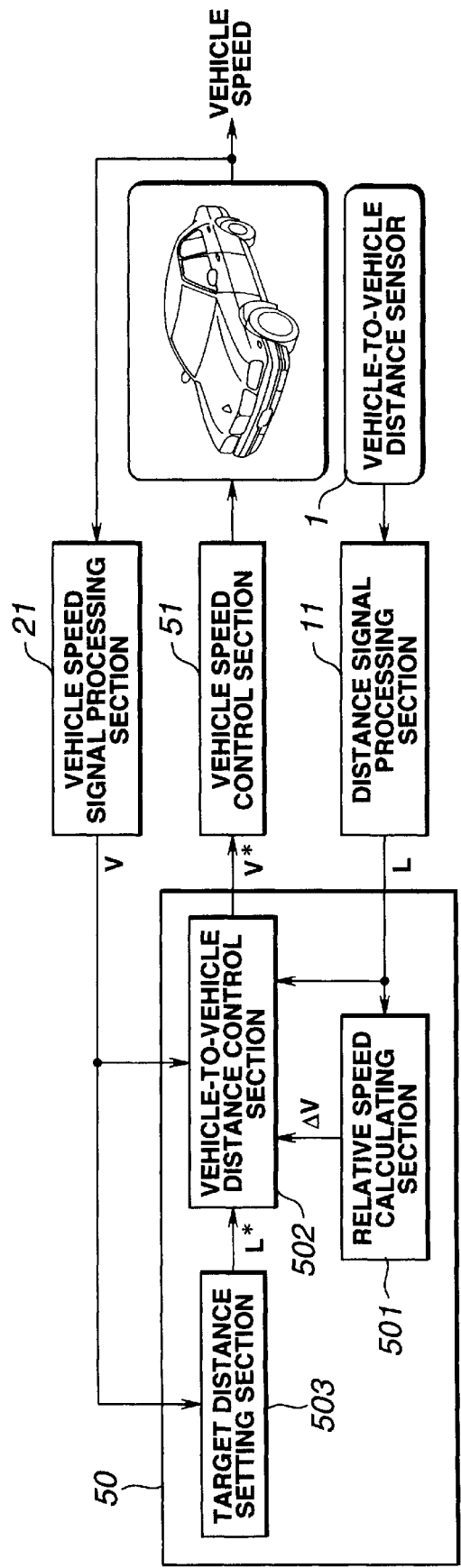
FIG. 2 is a block diagram showing a control system of a follow-up controller of the first embodiment.

The follow-up controller 5 comprises a microcomputer and peripheral devices thereof, and controls the throttle actuator 3, the automatic transmission 4 and the braking apparatus 6 upon obtaining the target vehicle speed V* on the basis of detection values of the vehicle-to-vehicle distance L and the vehicle speed V. The follow-up controller 5 comprises a distance signal processing section 11, a vehicle speed signal processing section 21, a vehicle follow-up control section 50 and a vehicle speed control section 51 in the form of soft ware as shown in FIG. 2.

The distance signal processing section 11 measures a time period from the moment that the laser beam outputted from the vehicle-to-vehicle distance sensor head 1 to a moment that the reflected beam of the preceding vehicle is received. The distance signal processing section 11 calculates a distance to the preceding vehicle on the basis of the measured time period. In case that a plurality of preceding vehicles cruise ahead of the controlled vehicle VE, the distance signal processing section 11 specifies one preceding vehicle and calculates a vehicle-to-vehicle distance to the specified preceding vehicle. The vehicle speed signal processing section 21 measures a cycle of the vehicle speed pulse from the vehicle speed sensor 2 and calculates the vehicle speed of the controlled vehicle VE.

The preceding vehicle follow-up control section 50 comprises a relative speed calculating section 501, a vehicle-to-vehicle distance control section 502 and a target vehicle-to-vehicle distance setting section 503. The preceding vehicle follow-up control section 50 calculates the target vehicle-to-vehicle distance L* and the target vehicle speed V*. The relative speed calculating section 501 calculates the relative speed ΔV of the controlled vehicle with respect to a preceding vehicle on the basis of the detected vehicle-to-vehicle distance L. The vehicle-to-vehicle distance control section 502 calculates the target vehicle speed V* for adjusting the vehicle-to-vehicle distance L to the target vehicle-to-vehicle distance L* upon taking account of the relative vehicle speed ΔV. The target vehicle-to-vehicle distance setting section 503 sets the target vehicle-to-vehicle distance L* according to a vehicle speed Vt of the preceding vehicle or the vehicle speed V of the controlled vehicle VE.

The vehicle speed control section 51 controls the throttle valve opening Tvo of the throttle actuator 3, the gear ratio of the automatic transmission 4 and the braking force of the braking apparatus 6 in order to adjust the vehicle speed V of the controlled vehicle VE to the target vehicle speed V*.

Figure 3:
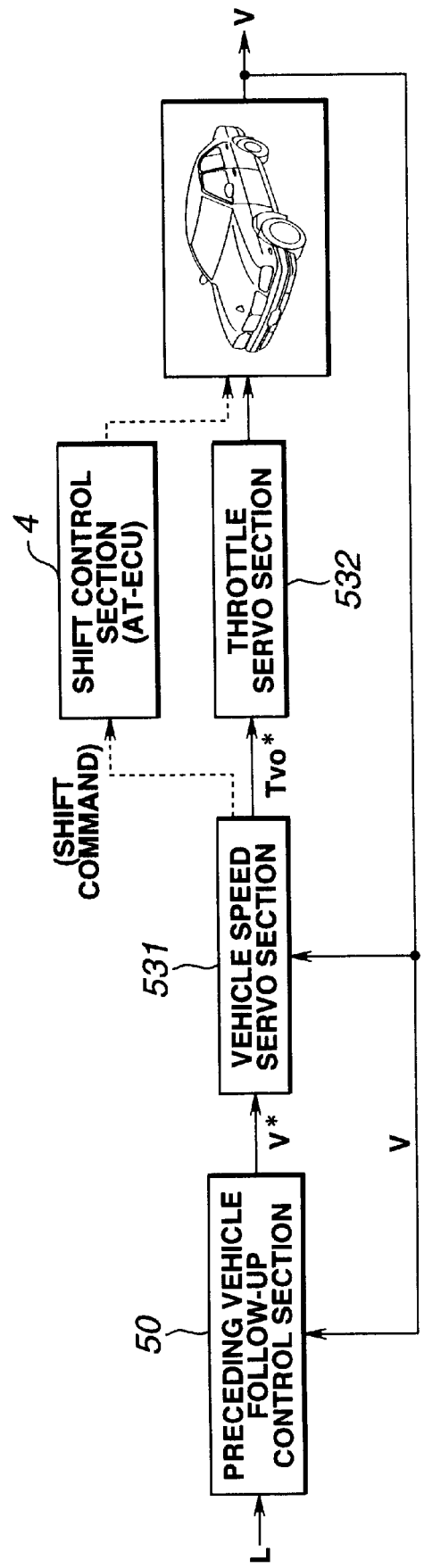
FIG. 3 is a block diagram showing a detailed construction of a vehicle speed control section of FIG. 2.

FIG. 3 shows a detailed structure of the vehicle speed control section 51 which includes a vehicle speed servo section 531, a shift control section 533 corresponding to the automatic transmission 4 and a throttle servo section 532. The vehicle speed servo section 531 controls a throttle servo section 532 by calculating a target throttle valve opening Tvo* in order to adjust the vehicle speed V to the target vehicle speed V*. The vehicle speed servo section 531 controls the automatic transmission 4 by determining the shift command. Further, The vehicle servo section 531 controls the braking apparatus 6 by determining a necessary braking force. The throttle servo section 532 drivingly controls the throttle actuator 3 on the basis of the target throttle valve opening Tvo*.

Figure 4:
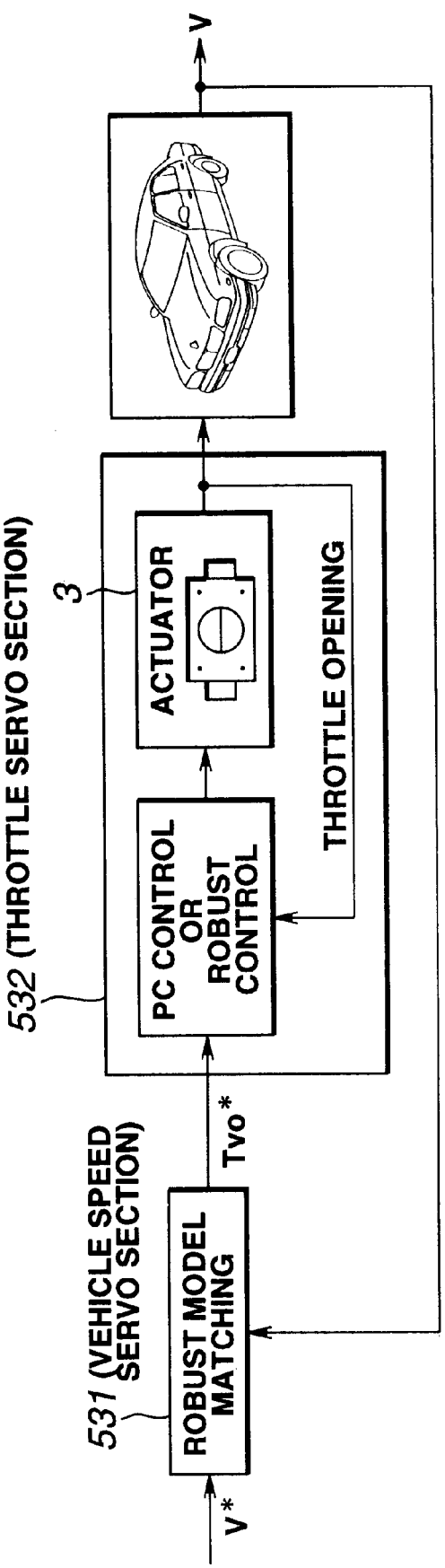
FIG. 4 is a block diagram showing a detailed construction of a vehicle speed servo section and a throttle servo section of FIG. 3.

FIG. 4 shows a further detailed structure of the vehicle speed servo section 531 and the throttle servo section 532. In order to adjust the actual throttle valve opening Tvo to the target throttle valve opening Tvo*, PI control method (Action) is employed, where an aimed target performance of the throttle servo system is determined according to an aimed performance of a vehicle speed servo system which is of an upper grade thereof. More particularly, when the vehicle servo system encounters with a case that it is necessary to suppress overshoot and undershoot of the vehicle speed V with respect to the change of the road gradient of ±6% within ±1 km/h, the throttle servo system is required to have a performance which is able to follow 1 Hz.

The vehicle speed servo section 531 is designed by "Robust Model Matching Control Method" in order to be a servo system durable to disturbance such as fluctuation of road gradient.

Figure 5:
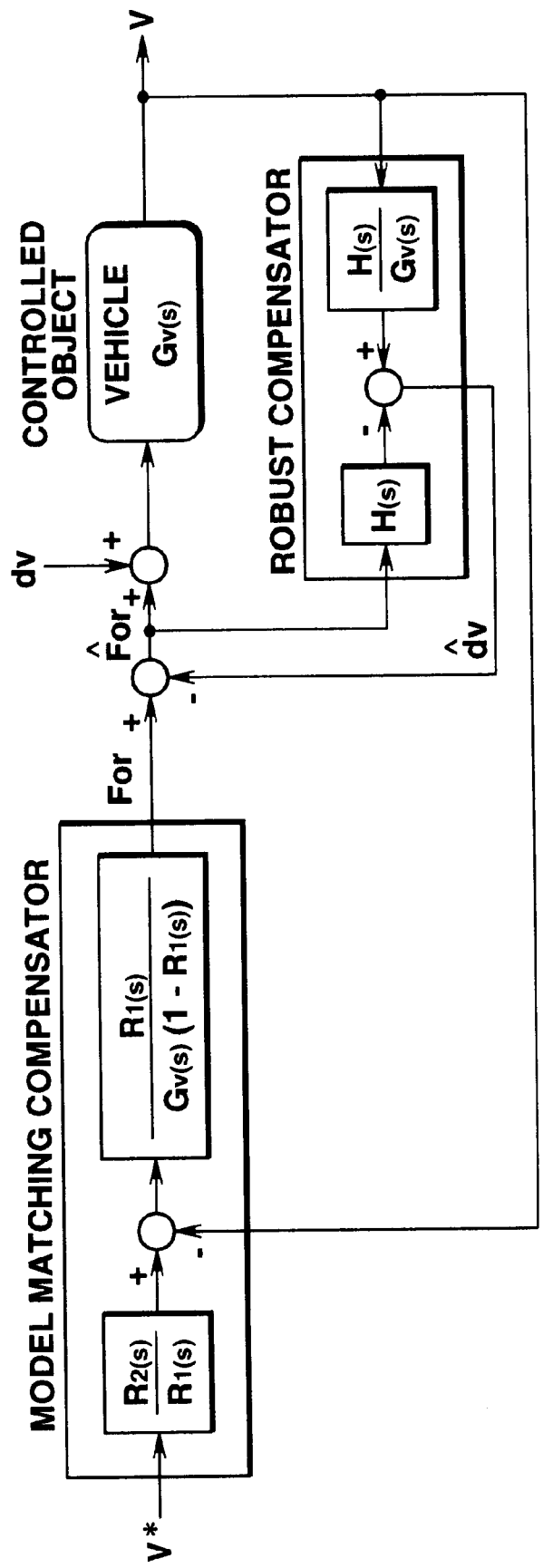
FIG. 5 is a block diagram showing a detailed construction of the vehicle speed servo section of FIG. 4.

FIG. 5 shows a detailed structure of the vehicle speed servo section 531. The robust model matching control system of the vehicle speed servo section 531 is provided with a robust compensator and a model matching compensator. The robust compensator is a so-called disturbance compensator and constructs a control system for adjusting the actual characteristic to a linear model GV(s) by estimating disturbance such as error due to modeling and running resistance of the controlled object and correcting thereby. H(s) is a robust filter for determining a disturbance removing performance of the robust compensator, and is for example constructed by a constant gain 1 and a low pass filter having a time constant Tc. Although the disturbance removing performance thereof is improved by heightening a cutoff frequency, the closed loop system including the robust compensator becomes unstable. This phenomenon is a so-called trade-off. Therefore, the cutoff frequency is determined upon taking account of the performance of the total system.

The model matching compensator is a compensator for adjusting the response characteristic of the vehicle speed servo system. The model matching compensator determines the input and output response characteristics at the norm model R2(s) of the feed-forward section and determines the disturbance removing performance and the stability at the norm model R1(s) of the feedback section.

Thus, if the vehicle servo system is designed by means of the robust model matching control method, it is possible to ensure the responsibility following up by the characteristic of the norm model with respect to the error due to modeling, the parameter fluctuation, disturbance and the like and the stability for quickly converging the internal variable without the divergence thereof.

Next, the calculating method of the relative speed $\Delta V$ between the controlled vehicle VE and the preceding vehicle will be discussed.

Figure 6:
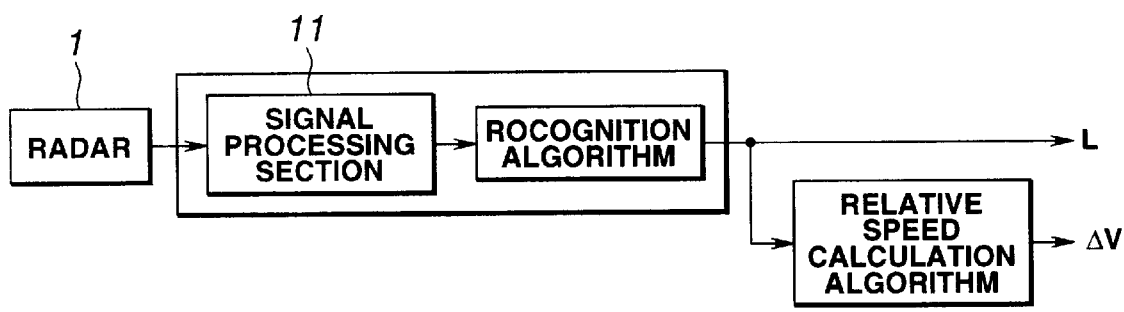
FIG. 6 is a block diagram showing a calculation method of a relative speed.

The relative speed $\Delta V$ is calculated on the basis of the vehicle-to-vehicle distance L detected by the vehicle-to-vehicle distance sensor head 1 and the distance signal processing section 11, as shown in FIG. 6.

Conventionally, a typical preceding vehicle follow-up control apparatus has been arranged to calculate the relative speed $\Delta V$ by executing an easy differential calculation from the change amount of the vehicle-to-vehicle distance L per unit time as shown by the following equation.

$$\Delta V = \{L(t) - L(t-\Delta t)\}/\Delta t \qquad (1)$$

However, this calculation method tends to be sensitive to noises and to generate fluctuation during the follow-up control. That is, it tends to apply some influence to the vehicle behavior.

Figure 7:
FIG. 7 is a block diagram showing a calculation method of the relative speed.

In order to cancel the above-mentioned tendendy, the preceding vehicle follow-up control apparatus according to the present invention present employs a method for approximately obtaining the relative speed $\Delta V$ by means of a band-pass filter or high-pass filter. That is, the vehicle-to-vehicle distance L transmitted by a band-pass filter or high-pass filter. For example, the band pass filter is represented by a transfer function shown by the following equation.

$$F(s) = \omega_c^2 s / (s^2 + 2\zeta\omega_c s + \omega_c^2) \qquad (2)$$

where $\omega_c = 2\pi fc$, and s is the Laplace operator. As is clear from the equation (2), the numerator of the transfer function of the band pass filter includes a differential term of the Laplace operator. As shown in FIG. 7, the relative speed $\Delta V$ is calculated by practically executing a differential of the vehicle-to-vehicle distance L. Similarly, it is possible to approximately obtain the relative speed $\Delta V$ by applying the high-pass filter to the vehicle-to-vehicle distance L. The cutoff frequency fc of the equation (2) is determined from the magnitude of noise component included in the vehicle-to-vehicle distance L and the allowable value of the fluctuation of G in the vehicle longitudinal direction having a short cycle.

Next, the control algorithm for following up the preceding vehicle while keeping the target vehicle-to-vehicle distance will be discussed.

The basic construction of the control system comprises the preceding vehicle follow-up control section 50 and the vehicle speed control section 51 independently. The preceding vehicle follow-up control section 50 outputs the target vehicle speed V* and is arranged so as not to directly control the vehicle-to-vehicle distance L.

Figure 8:
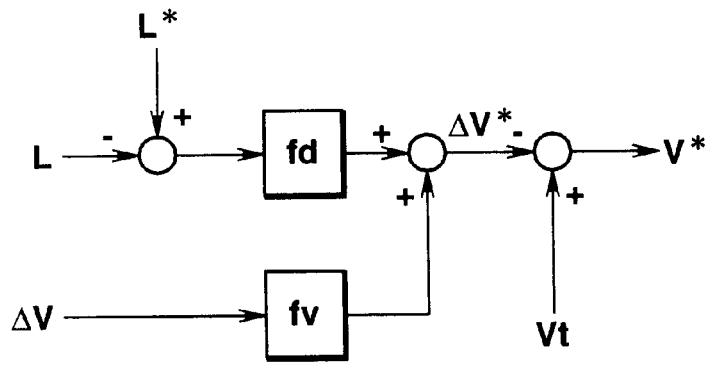
FIG. 8 is a block diagram showing a calculation method of a target vehicle speed.
Figure 9:
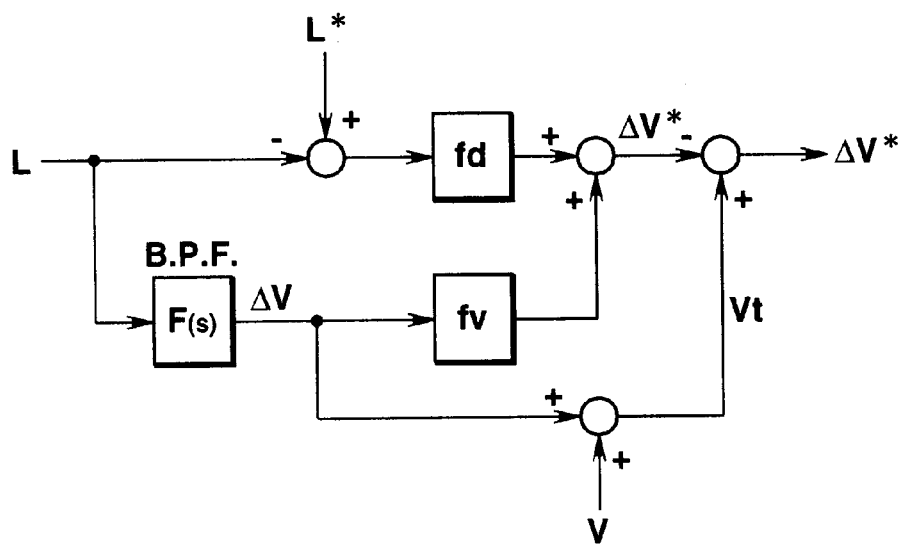
FIG. 9 is a block diagram showing a calculation method of the target vehicle speed.
Figure 10:
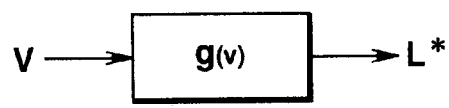
FIG. 10 is a block diagram showing a calculation method of a target vehicle-to-vehicle distance.
Figures 11A, 11B, 11C, 11D:
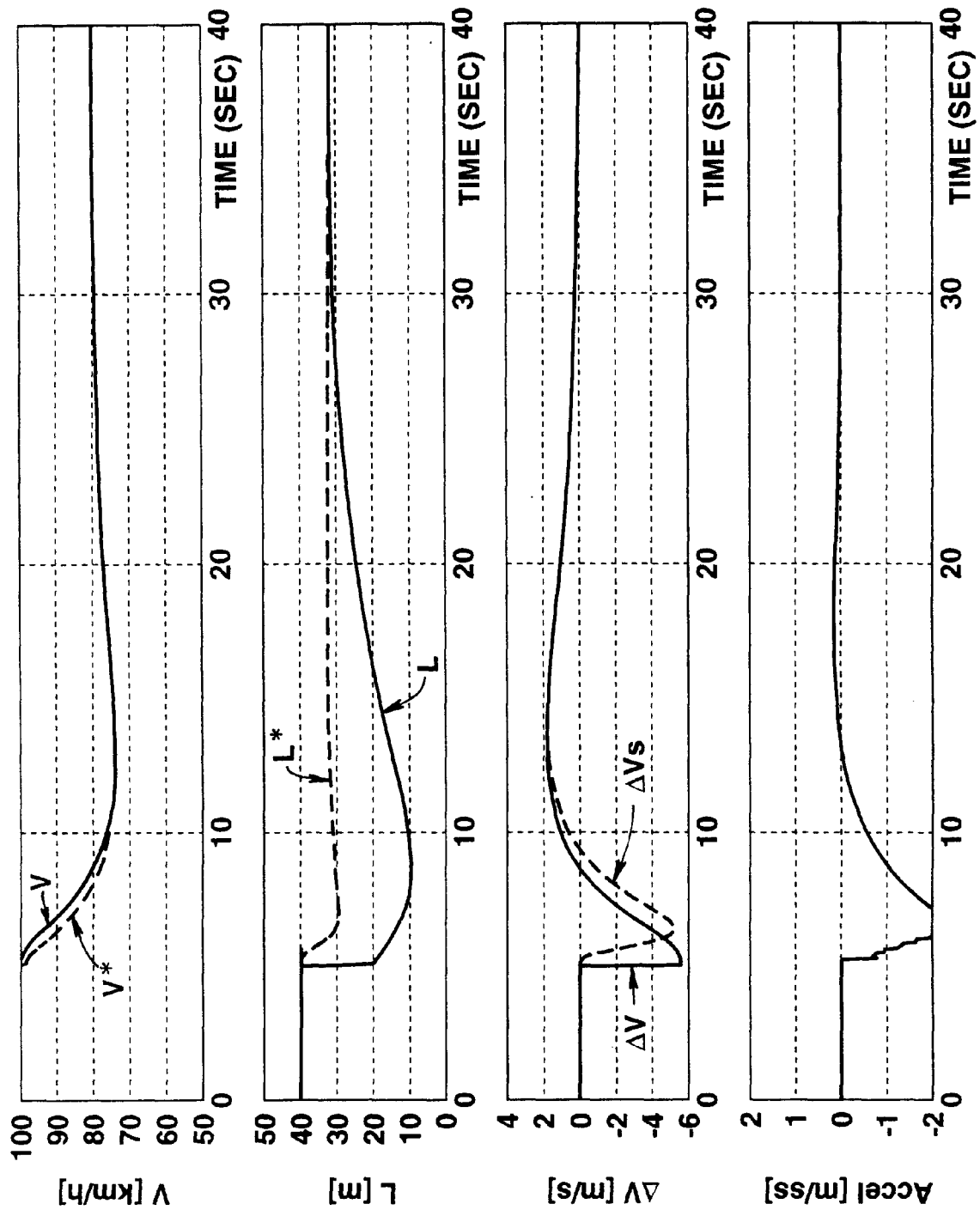
FIGS. 11A to 11D are graphs showing a result of a simulation of the first embodiment.
Figure 12A:
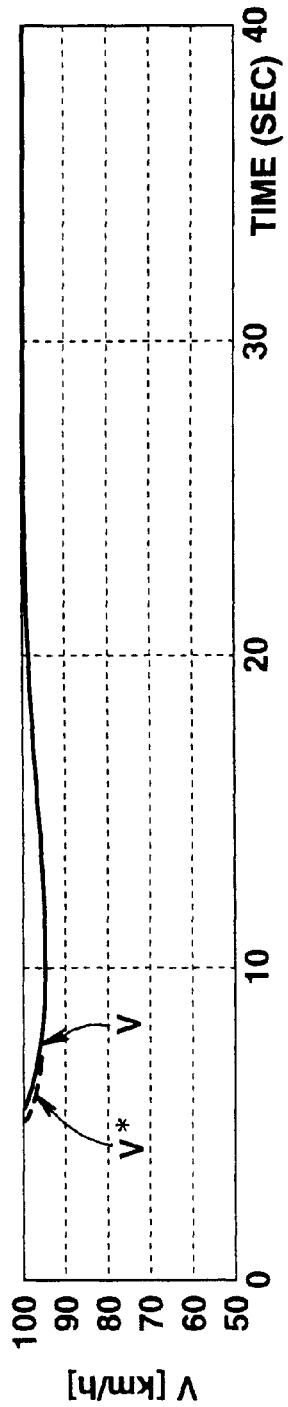
FIGS. 12A to 12D are graphs showing a result of a simulation of the first embodiment.
Figure 12B:
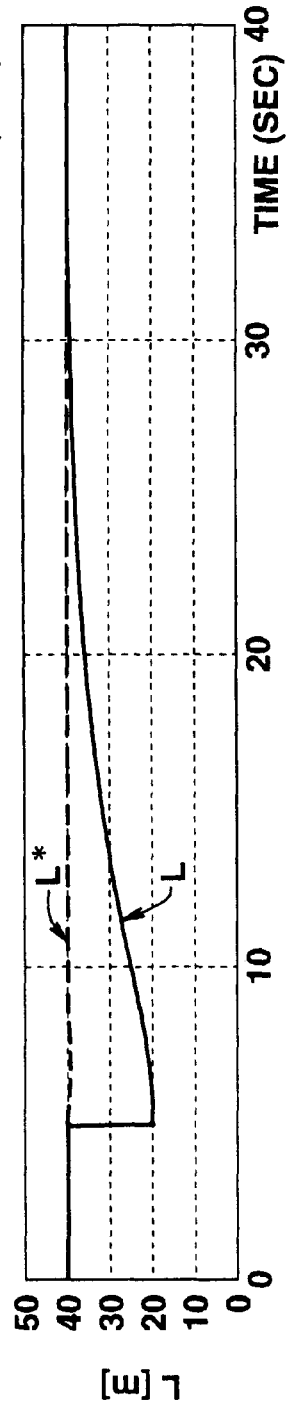
Figure 12C:
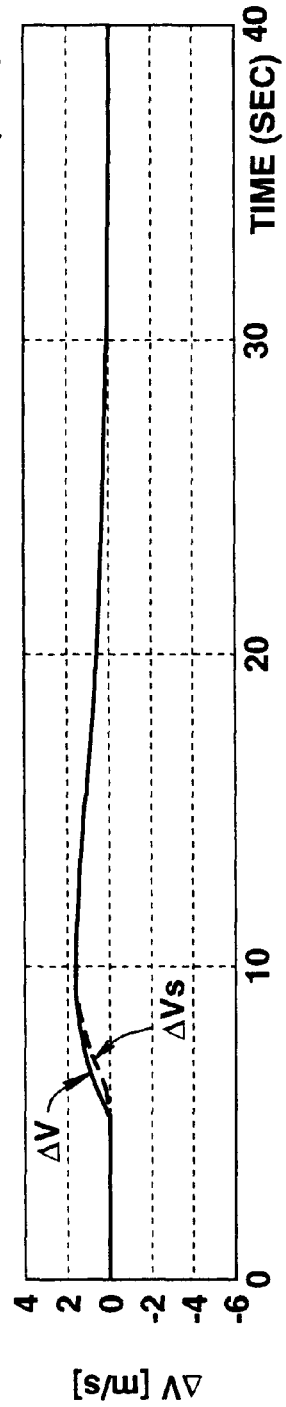
Figure 12D:
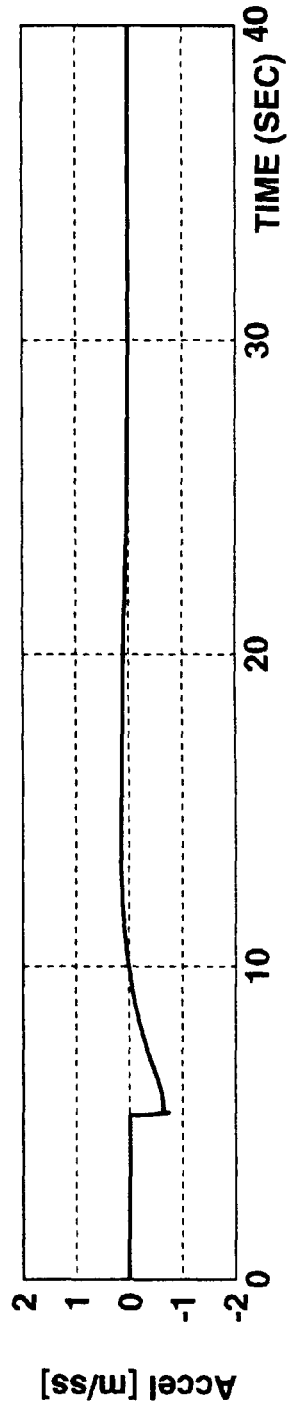
Figures 13A, 13B, 13C, 13D:
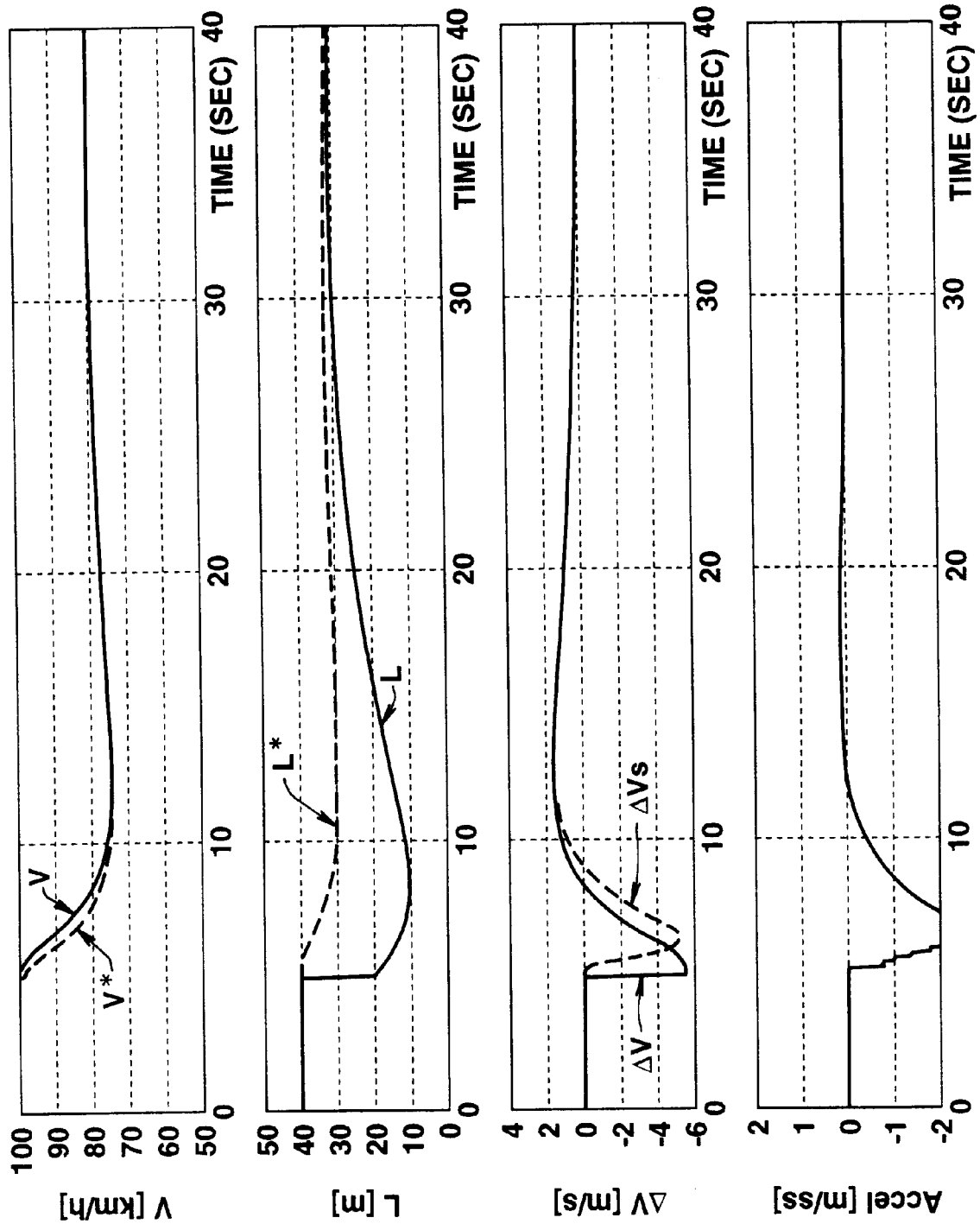
FIGS. 13A to 13D are graphs showing a result of a simulation of the first embodiment.
Figure 14A:
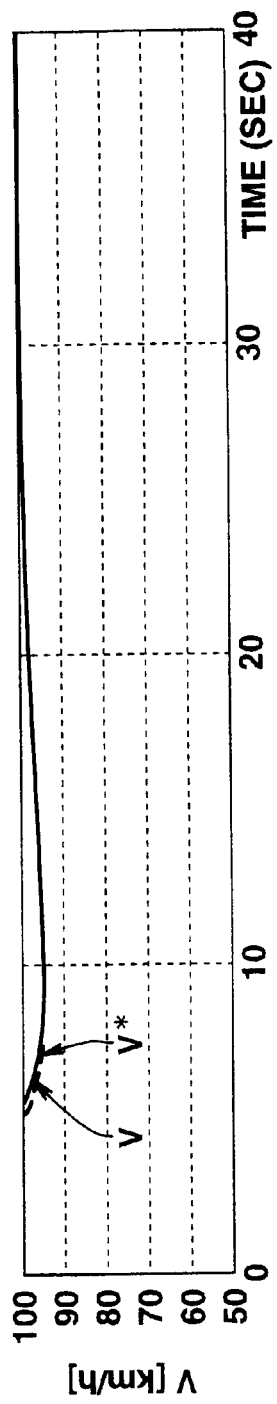
FIGS. 14A to 14D are graphs showing a result of a simulation of the first embodiment.
Figure 14B:
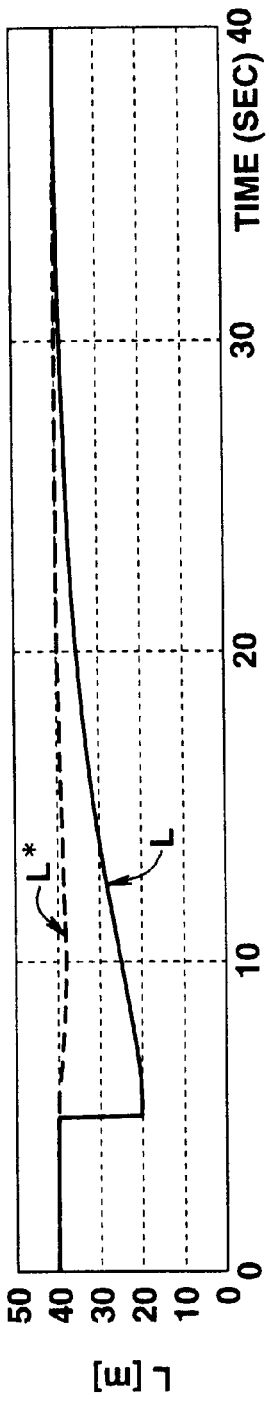
Figure 14C:
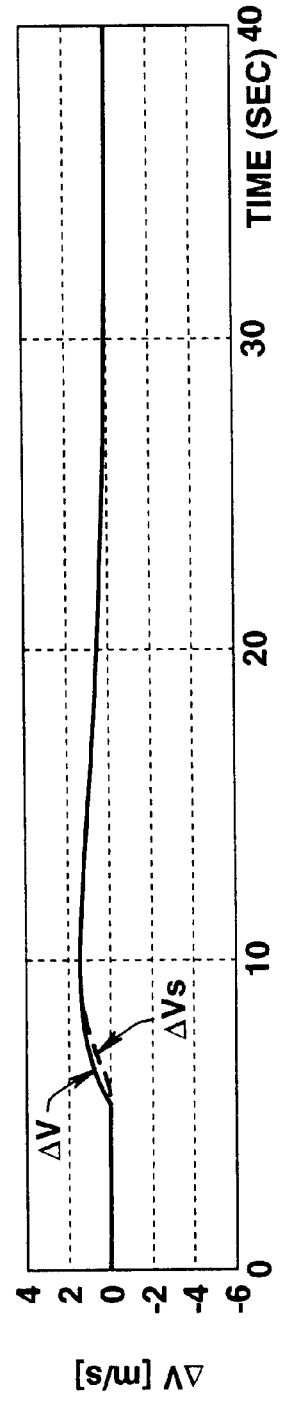
Figure 14D:
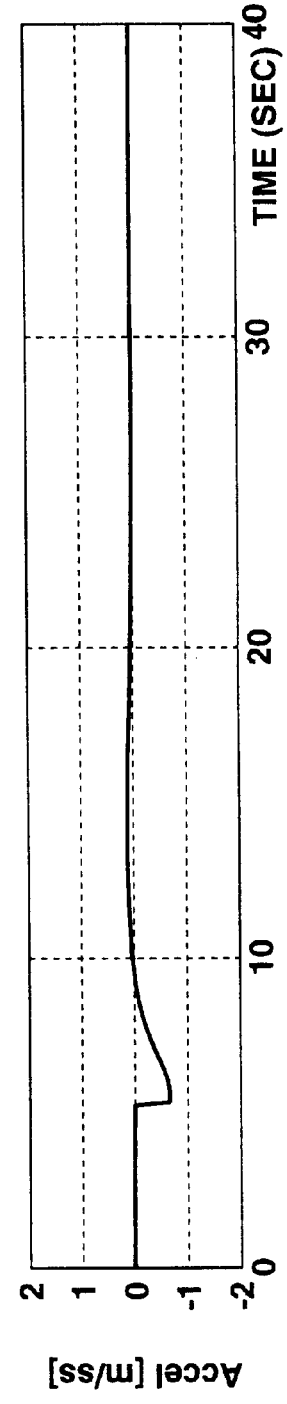
Figures 15A, 15B, 15C, 15D:
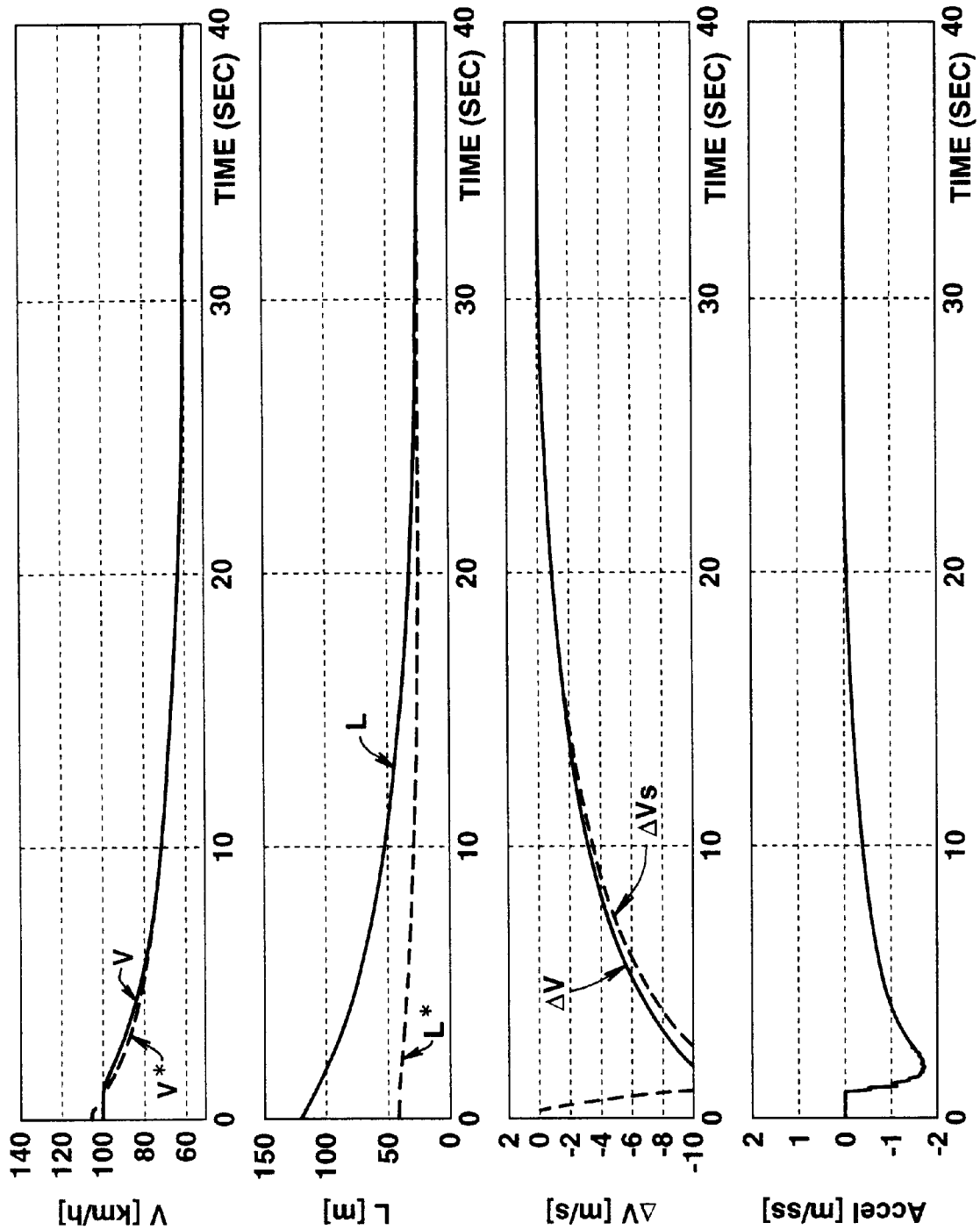
FIGS. 15A to 15D are graphs showing a result of a simulation of the first embodiment.

A vehicle-to-vehicle distance control section 502 of the preceding vehicle follow-up control section 50 calculates the target vehicle speed V* for following up the preceding vehicle while keeping the vehicle-to-vehicle distance L at the target value L*, on the basis of the vehicle-to-vehicle distance L, the target vehicle-to-vehicle distance L* and the relative speed $\Delta V$. More particularly, the target relative-speed $\Delta V^*$ is obtained from a form including a linear combination of a first value (first product) obtained by multiplying the gain fd (first gain) to a difference (L*–L) between the target vehicle-to-vehicle distance L* and the actual vehicle-to-vehicle distance L and a second value (second product) obtained by multiplying a gain fv (second gain) to the relative speed $\Delta V$. Further, the target vehicle speed V* is calculated by subtracting the target relative speed $\Delta V^*$ from the preceding vehicle speed Vt, as shown in FIG. 8.

$$\Delta V^* = fd \cdot (L^* - L) + fv \cdot \Delta V \qquad (3)$$

$$V^* = Vt - \Delta V^* \qquad (4)$$

The first and second gains fd and fv are parameters for determining the follow-up control performance. Since this system is a one-input and two-output system which controls two target values (the vehicle-to-vehicle distance and the relative speed) by one input (target vehicle speed), the control system is designed by using the condition feedback (regulator) control method. Hereinafter, the procedure for designing the control system will be discussed.

Condition variables x1 and x2 of the system are defined by the following equations.

$$x1 = Vt - V \qquad (5)$$

$$x2 = L^* - L \qquad (6)$$

Further, the control input (the output of the controller 5) is determined as V* and is defined by the following equation.

$$V^* = Vt - \Delta V^* \qquad (7)$$

The vehicle-to-vehicle distance L is obtained by the following equation.

$$L = \int (Vt - V)dt + L0 \qquad (8)$$

where L0 is an initial value of the vehicle-to-vehicle distance L.

The vehicle speed servo system is approximately represented by the linear transfer function in which the actual vehicle speed V is a first order lag with respect to the target vehicle speed V*, such as shown in the following equations.

$$V = V^* / (1 + \tau_v \cdot s) \qquad (9)$$

$$dV/dt = (V^* - V)/\tau_v \qquad (10)$$

When it is assumed that the vehicle speed Vt of the preceding vehicle is constant, the following equation (11) is obtained from the equations (5), (7) and (10).

$$dx1/dt = (-1/\tau_v)x1 + (1/\tau_v)\Delta V^* \qquad (11)$$

Further, when it is assumed that the target vehicle-to-vehicle speed L* is constant, the following equation (12) is obtained from the equations (6) and (8).

$$dx2/dt = -(Vt-V) = -x1 \quad (12)$$

Accordingly, the state equation of the system is represented as follows.

$$\frac{d}{dt}\begin{bmatrix} x1 \\ x2 \end{bmatrix} = \begin{bmatrix} -1/\tau_v & 0 \\ -1 & 0 \end{bmatrix}\begin{bmatrix} x1 \\ x2 \end{bmatrix} + \begin{bmatrix} 1/\tau_v \\ 0 \end{bmatrix}\Delta V* \quad (13)$$

$$\therefore \dot{X} = AX + Bu \quad (13A)$$

where $$X = \begin{bmatrix} x1 \\ x2 \end{bmatrix}, A = \begin{bmatrix} -1/\tau_v & 0 \\ -1 & 0 \end{bmatrix}, B = \begin{bmatrix} 1/\tau_v \\ 0 \end{bmatrix}, u = \Delta V*.$$

The control input u is applied by the following equation.

$$u = FX, \text{ where } F = [fv\ fd] \quad (14)$$

The state equation of the total system to which state feedback is applied is represented by the following equation.

$$\therefore \dot{X} = (A + BF)X \quad (15)$$

if $A' = A + Bf$, $$A' = \begin{bmatrix} -(fv-1)/\tau_v & fd/\tau_v \\ -1 & 0 \end{bmatrix} \quad (16)$$

Accordingly, the characteristic equation of the whole system is derived as follows.

$$|sI - A'| = s^2 + \frac{(1-fv)}{\tau_v}s + \frac{fd}{\tau_v} = 0 \quad (17)$$

As mentioned above, the vehicle speed servo system is approximately represented by the linear transfer function, and therefore the first and second gains fd and fv are designed such that the convergent characteristic, in which the vehicle-to-vehicle distance L is converged into the target vehicle-to-vehicle distance L* and the relative speed ΔV into 0, respectively, on the basis of the this characteristic, is set to the characteristic intended by a designer. For example, the gains for satisfying that the time constant of the vehicle speed servo system is set that $\tau_v = 0.5$ [sec] and the pole (target value) of the preceding vehicle control system is $0.14 \pm 0.15$ j ($\omega_n = 0.2$, $\zeta = 0.7$), are determined as follows.

$$s^2 + 2\zeta\omega_n s + \omega_n^2 = s^2 + 0.28s + 0.04 = 0 \quad (18)$$

From the equation (17) and (18), $$(1-fv)/\tau_v = 2 - 2fv = 0.28 \quad (19)$$

$$fd/\tau_v = 2fd = 0.04 \quad (20)$$

Accordingly, the first and second gains fv and fd becomes as follows.

$$fv = 0.86$$

$$fd = 0.02 \quad (21)$$

In this embodiment, since the relative speed ΔV is a difference between the vehicle speed Vt of the preceding vehicle and the vehicle speed V of the controlled vehicle VE, the vehicle speed Vt of the preceding vehicle is calculated by using the vehicle speed V of the controlled vehicle VE and the relative speed ΔV obtained from the vehicle-to-vehicle distance data.

$$Vt = V + \Delta V \quad (22)$$

Accordingly, in this case, the target vehicle speed V* is represented as follows from the equations (3), (4) and (22).

$$V* = V - fd(L*-L) + (1-fv)\Delta V \quad (23)$$

In order to prevent radical acceleration or deceleration of the vehicle VE, the change amount of the target vehicle speed V* per unit time is limited.

On the other hand, the target vehicle-to-vehicle distance L* may be set by employing a concept of a vehicle-to-vehicle time employed in an alarm device for alarming an approach of a preceding vehicle. Herein the target vehicle-to-vehicle distance L* is defined as a function of the vehicle speed Vt of the preceding vehicle, in view of that it does not affect the convergence of the control. By using the vehicle speed Vt defined by the equation (22), the target vehicle-to-vehicle distance L* is obtained as follows.

$$L* = a \cdot Vt + Lof \quad (24)$$

where a is a coefficient, and Lof is an offset.

If the vehicle speed Vt of the preceding vehicle is calculated on the basis of the vehicle speed V of the controlled vehicle VE and the relative speed ΔV, it is affected by the noises superimposed by the relative speed ΔV. Therefore, the target vehicle-to-vehicle distance L* is set as a function of the vehicle speed V of the controlled vehicle VE. For example, the target vehicle-to-vehicle distance L* is set by the following equation.

$$L* = a \cdot V + Lof \quad (25)$$

FIGS. 11A to 15D show results of simulations of the first embodiment.

In each graph showing the change of the vehicle speed, a continuous line represents the vehicle speed V of the controlled vehicle VE, and a broken line represents the target vehicle speed V*. In each graph showing the change of the vehicle-to-vehicle distance, a continuous line represents the vehicle-to-vehicle distance L, and a broken line represents the target vehicle-to-vehicle distance L*. In each graph showing the change of the relative speed, a continuous line represents the actual relative speed ΔV, and a broken line represents the calculated relative speed ΔVs by the band-pass filter. In each graph showing the change of acceleration, a continuous line represents vehicle body acceleration.

The adapted simulation conditions were as follows.

(1) When the controlled vehicle cruises at a vehicle speed of 100 km/h and follows up a preceding vehicle with a vehicle-to-vehicle distance of 40 m, a vehicle cruising at 80 km/h vehicle speed cut in a position 20 m ahead of the controlled vehicle.

(2) Similarly a vehicle cruising at 100 km/h vehicle cut in the position.

(3) When the controlled vehicle cruises at 100 km/h vehicle speed, a vehicle cruising at 60 km/h vehicle speed is recognized.

In these three situations, the simulations were executed as to a case that the target vehicle-to-vehicle distance L* is set as the function of the vehicle speed Vt of the preceding vehicle (the equation (24)) and as to a case that it se set as the function of the vehicle speed V of the controlled vehicle (the equation (25)). The pole of the system was −0.17±0.19 j, and the feedback gains were fv=0.87 and fd=0.02

FIGS. 11A to 12D show the result of the case that the target vehicle-to-vehicle distance L* is set as the function of the vehicle speed Vt of the preceding vehicle. FIGS. 11A to 11D show the result executed in the simulation condition (1). FIGS. 12A to 12D show the result executed in the simulation condition (2).

FIGS. 13A to 15D show the result of the case that the target vehicle-to-vehicle distance L* is set as the function of the vehicle speed V of the controlled vehicle VE. FIGS. 13A to 13D show the result executed in the simulation condition (1). FIGS. 14A to 14D show the result executed in the simulation condition (2). FIGS. 15A to 15D show the result executed in the simulation condition (3).

In case of the simulation condition (1), that is, in case that when the controlled vehicle VE cruises at a vehicle speed of 100 km/h and follows up a preceding vehicle with a vehicle-to-vehicle distance of 40 m, a vehicle cruising at 80 km/h vehicle speed cut in a position 20 m ahead of the controlled vehicle VE, as shown in FIGS. 11 and 13, the change of the relative speed ΔV at the cut-in time is generally a difference 20 km/h of the vehicle speed between the preceding vehicle and the cut-in vehicle, and the vehicle-to-vehicle distance L approaches the target vehicle-to-vehicle distance L* (about 32 m) according to the vehicle speed Vt of the preceding vehicle and the vehicle speed V of the controlled vehicle VE while sufficiently suppressing the change of the relative speed ΔV.

In case of the simulation condition (2), that is, in case that when the controlled vehicle VE cruises at a vehicle speed of 100 km/h and follows up a preceding vehicle with a vehicle-to-vehicle distance of 40 m, a vehicle cruising at 100 km/h vehicle speed cut in a position 20 m ahead of the controlled vehicle VE, as shown in FIGS. 12A to 12D and 14A to 14D, the vehicle-to-vehicle distance L approaches the target vehicle-to-vehicle distance L* (40 m) while suppressing the change of the relative speed ΔV.

In the construction of the first embodiment, the vehicle speed sensor 2 and the vehicle speed signal processing section 21 constitute a controlled vehicle speed detecting means, the vehicle-to-vehicle distance sensor head 11 and the measured signal processing section 11 constitute vehicle-to-vehicle distance detecting means, the preceding vehicle follow-up control section 50 constitutes vehicle speed calculating section, the vehicle speed control section 51 constitutes vehicle speed controlling means, and the relative speed calculating section 501 constitutes relative speed detecting means.

According to the first embodiment of the preceding vehicle follow-up control apparatus according to the present invention, the target vehicle speed taking account of the relative speed is calculated so as to converge the vehicle-to-vehicle speed at the target value without excessively changing the relative speed during the follow-up control.

Referring to FIGS. 16 to 24D, there is shown a second embodiment of the vehicle-to-vehicle follow-up control apparatus according to the present invention. The construction of the vehicle-to-vehicle follow-up control apparatus vehicle of the second embodiment is basically the same as that of the first embodiment shown in FIGS. 1 and 2 except that the first and second gains fd and fv are changed according to the vehicle-to-vehicle distance L. Same parts and elements are designated by same reference numerals of the first embodiment, and the explanation thereof will be omitted herein.

Figure 16:
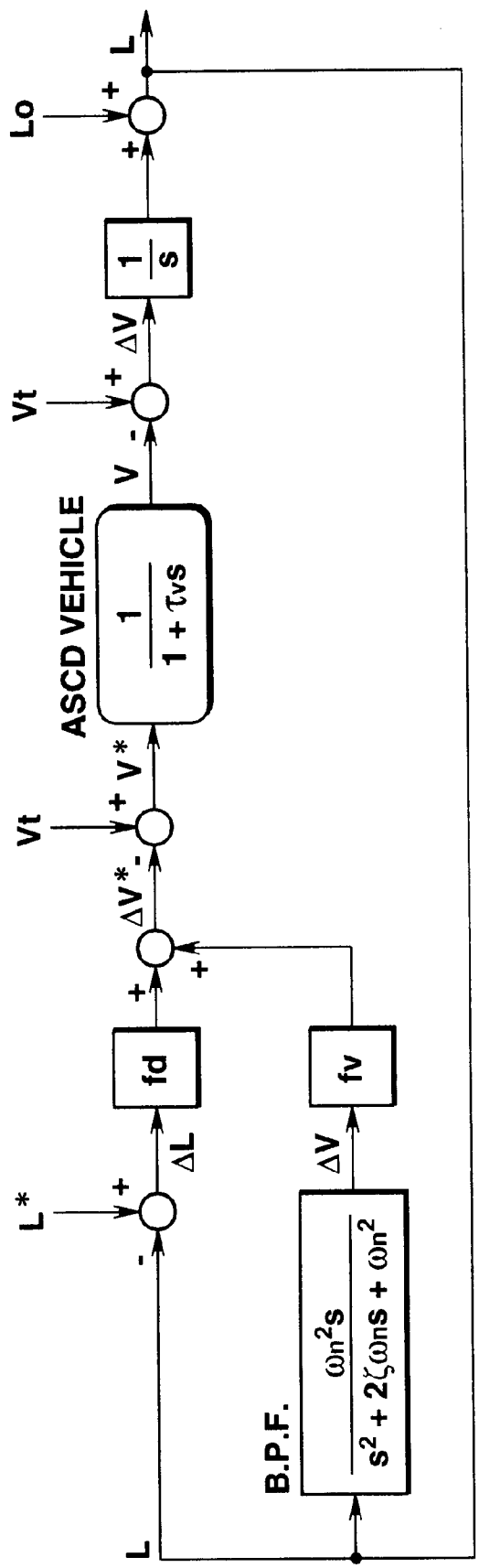
FIG. 16 is a block diagram showing a control system of the preceding-vehicle follow-up control apparatus according to the present invention.
Figure 17A:
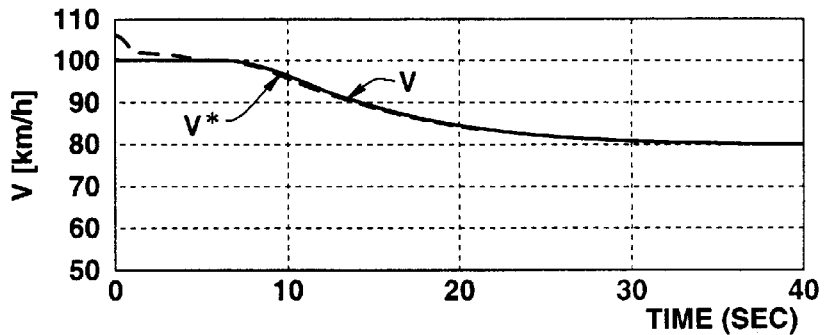
FIGS. 17A to 17D are graphs showing a result of a simulation of a second embodiment.
Figure 17B:
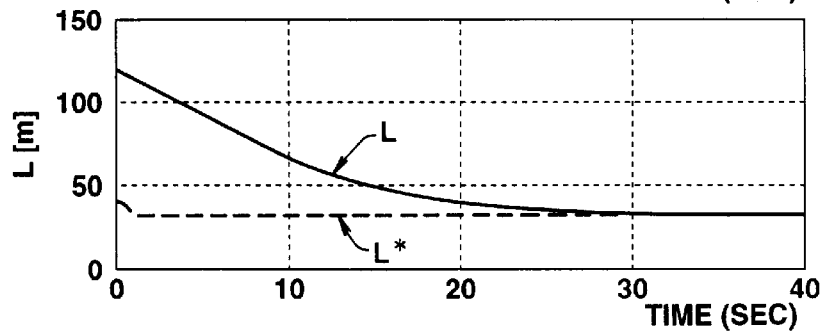
Figure 17C:
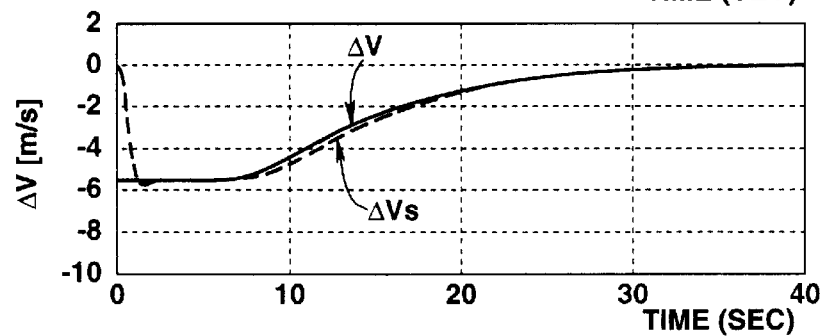
Figure 17D:
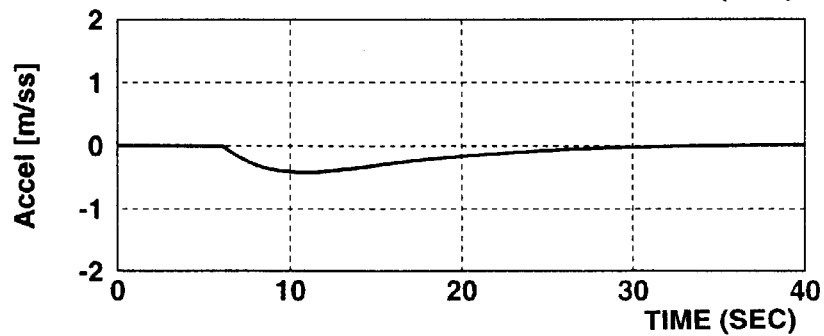
Figure 18A:
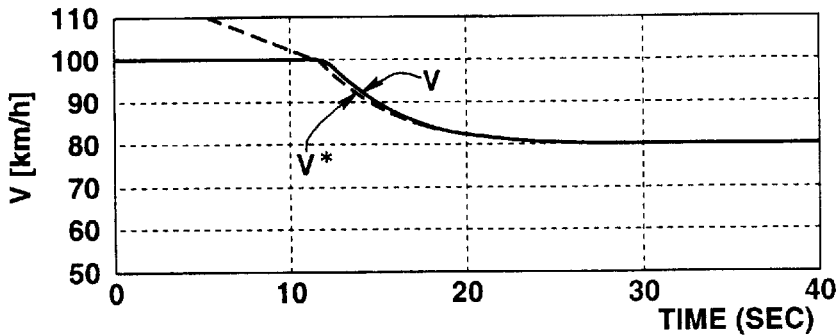
FIGS. 18A to 18D are graphs showing a result of a simulation of the second embodiment.
Figure 18B:
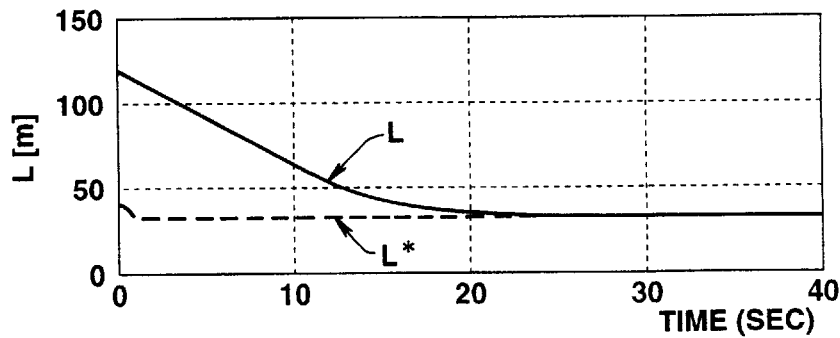
Figure 18C:
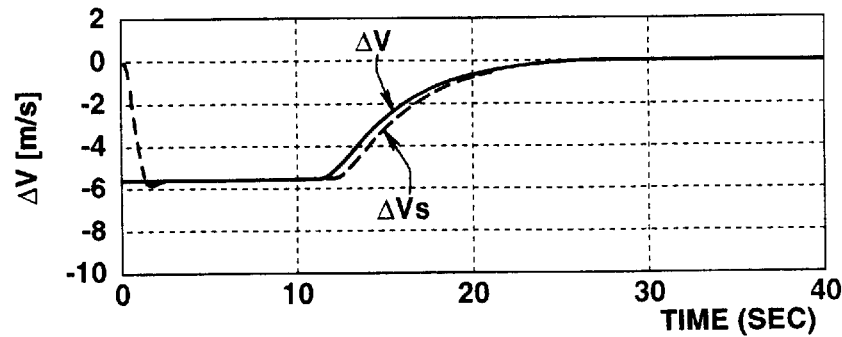
Figure 18D:
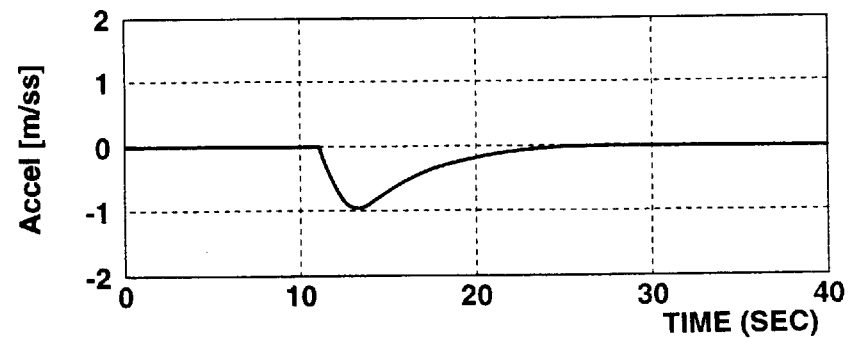
Figure 19A:
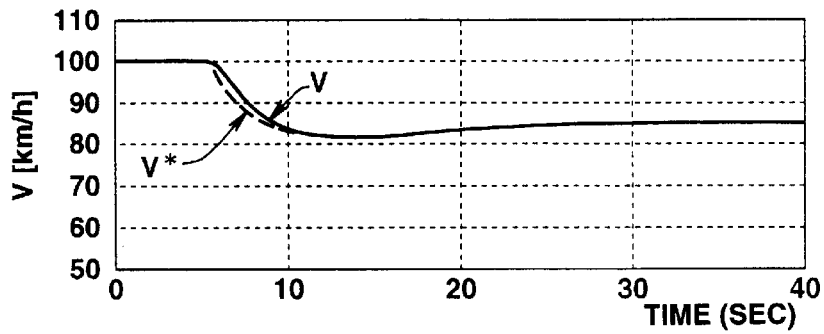
FIGS. 19A to 19D are graphs showing a result of a simulation of the second embodiment.
Figure 19B:
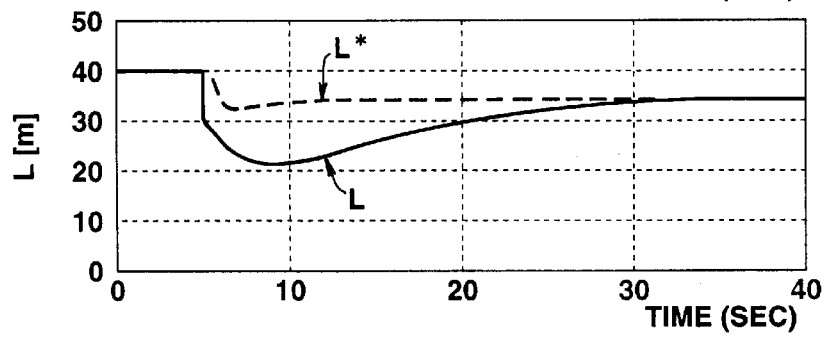
Figure 19C:
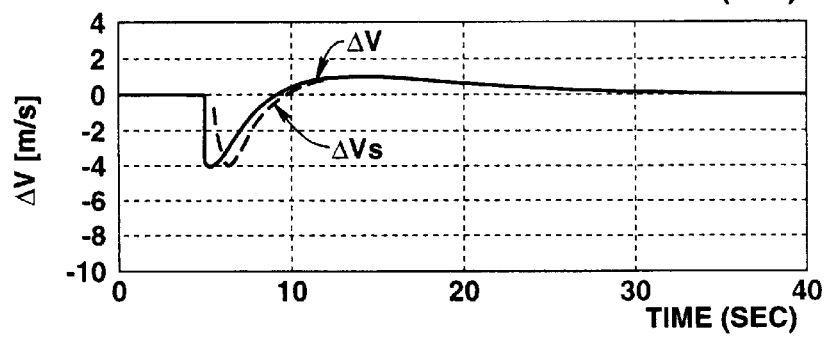
Figure 19D:
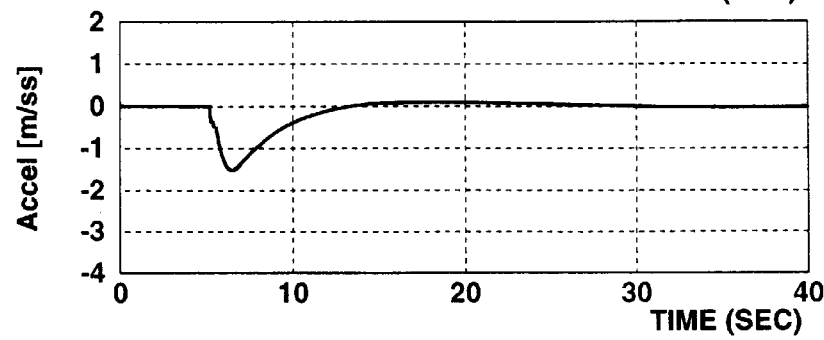
Figure 20A:
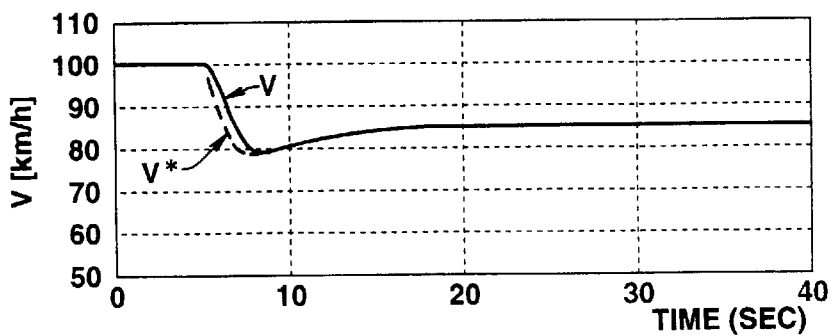
FIGS. 20A to 20D are graphs showing a result of a simulation of the second embodiment.
Figure 20B:
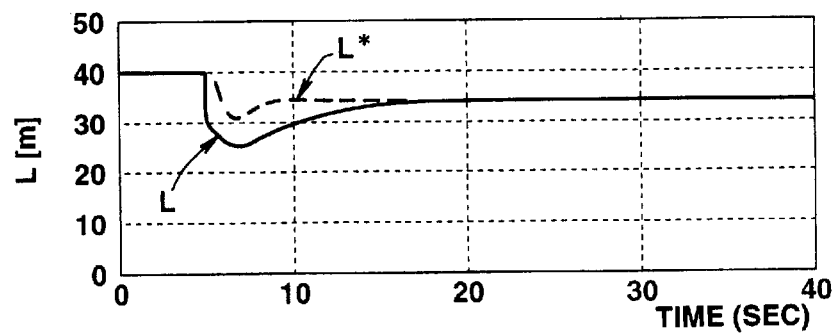
Figure 20C:
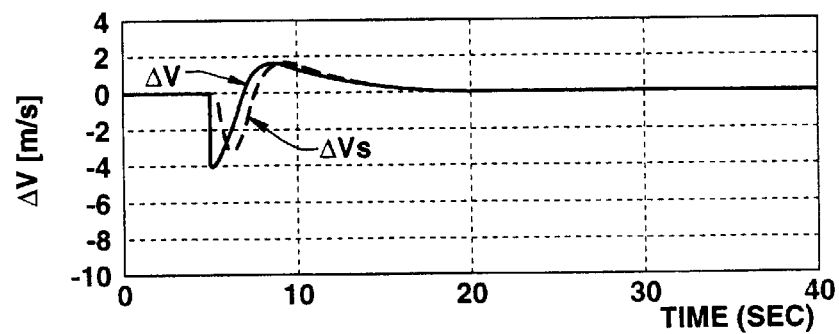
Figure 20D:
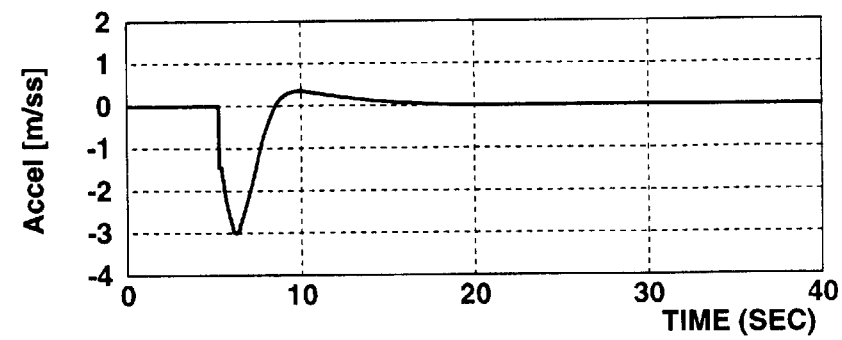

In order to further clear the relationship between the control system and the employed equations, brief explanation thereof will be add hereinafter with reference to FIG. 16.

The control system calculates the target vehicle speed V* for executing a follow-up cruising while keeping the vehicle-to-vehicle distance L at the target value L*. As shown in FIG. 16, the target relative speed ΔV* is calculated from the sum of a product of the first gain fd and a difference ΔL between the target vehicle-to-vehicle distance L* and the vehicle-to-vehicle distance L and a product of the second gain fv and the relative speed ΔV.

$$\Delta V^* = fd \cdot \Delta L + fv \cdot \Delta V \tag{3}$$

where the gains fd and fv are parameters for determining the follow-up control performance. The relative speed ΔV is obtained by filtering (transmitting) the vehicle-to-vehicle distance L by means of a band-pass filter B.P.F., and the vehicle speed Vt of the preceding vehicle is calculated by the equation (22).

$$Vt = V + \Delta V \tag{22}$$

Next, the target vehicle speed V* is obtained by subtracting the target relative speed ΔV* from the vehicle speed Vt of the preceding vehicle.

$$V^* = Vt - \Delta V \tag{4}$$

Accordingly, the target vehicle speed V* is represented from the equation (3), the equation (4) and the equation (22) as follows.

$$V^* = V + \Delta V - (fd \cdot \Delta L + fv \cdot \Delta V) \tag{23A}$$

According to the target vehicle speed, the controlled vehicle VE equipped with ASCD (automatic speed control device) controls the vehicle speed V. Then, according to the relative speed ΔV, which is of the difference between the vehicle speed V and the preceding vehicle speed Vt, the vehicle-to-vehicle distance L is controlled.

As mentioned in the first embodiment, the control system of the second embodiment is also a one-input and two-output system which controls two target values of the vehicle-to-vehicle distance L and the relative speed ΔV by one input of the target vehicle speed V*. Therefore, the control system is designed by means of a condition feed back (regulator). Condition variables x1 and x2 of the system are defined by the following equation (5) and (6).

$$x1 = Vt - V \tag{5}$$

$$x2 = L^* - L \tag{6}$$

The control input (an output of the controller) is defined as V* and is defined by the following equation.

$$V^* = Vt - \Delta V^* \tag{4}$$

The vehicle-to-vehicle distance L is represented by the following equation.

$$L = \int (Vt - V)dt + L_0 \quad (8)$$

In the equation (8), $L_0$ is an initial value of the vehicle-to-vehicle distance.

The vehicle speed servo system is approximated, for example, by a linear transfer function in which the actual vehicle speed with respect to the target vehicle speed becomes the first order lag, as represented by the following equation.

$$V = \frac{1}{1 + \tau_v s} V* \quad (9)$$

When it is assumed that the vehicle speed Vt of the preceding vehicle is constant, from the equations (4), (8) and (9), $$\dot{x}1 = -\frac{1}{\tau_v} x1 + \frac{1}{\tau_v} \Delta V* \quad (11A)$$

Further, when it is assumed that the target vehicle-to-vehicle distance L* is constant, from the equation (6) and (8), $$\dot{x}2 = -(Vt - V) = -x1 \quad (12A)$$

Accordingly, the state equation of the system is represented as follows.

$$\frac{d}{dt}\begin{bmatrix} x1 \\ x2 \end{bmatrix} = \begin{bmatrix} -1/\tau_v & 0 \\ -1 & 0 \end{bmatrix}\begin{bmatrix} x1 \\ x2 \end{bmatrix} + \begin{bmatrix} 1/\tau_v \\ 0 \end{bmatrix} \Delta V* \quad (13)$$

The control input u is defined by the following equations.

$$u = FX, \text{ where } F = [fv \; fd] \quad (14)$$

The state equation of the total system to which state feedback is applied is represented by the following equation.

$$\dot{X} = (A + BF)X \quad (15A)$$

$$A' = (A + BF) = \begin{bmatrix} -(fv - 1)/\tau_v & fd/\tau_v \\ -1 & 0 \end{bmatrix} \quad (16)$$

Accordingly, the characteristic equation of the whole system is defined as follows.

$$|sI - A'| = s^2 + \frac{(1 - fv)}{\tau_v} s + \frac{fd}{\tau_v} = 0 \quad (17)$$

On the basis of the transfer characteristic of the above-mentioned vehicle speed servo system, the gains fd and fv are designed such that the convergent characteristic, in which the vehicle-to-vehicle distance L is converged into the target value L* and the relative speed $\Delta V$ to 0 respectively on the basis of the this characteristic, is set to the characteristic intended by a designer.

$$s^2 + \frac{(1 - fv)}{\tau_v} s + \frac{fd}{\tau_v} = s^2 + 2\zeta\omega_n s + \omega_n^2 = 0 \quad (26)$$

-continued $$fd = \omega_n^2 \cdot \tau_v \quad (27)$$

$$fv = 1 - 2\zeta\omega_n \cdot \tau_v \quad (28)$$

The convergence characteristic of the follow-up control system applying the state feedback is approximated by a second order system, as represented by the equation (17). For example, when it is assumed that the time constant of the vehicle speed servo system is defined such that $\tau v = 0.5$ s and the pole of the system is set as a first setting ① in which a pole has a late convergence characteristic or a second setting ② in which a pole has a quick convergence characteristic, the first and second gains fd and fv are obtained from the equations (27) and (28) as follows.

① equal root: −0.1 ($\omega_n$=0.2, $\zeta$=1.0)→fd=0.02, fv=0.8

② equal root: −0.4 ($\omega_n$=0.4, $\zeta$=1.0)→fd=0.08, fv=0.6

FIGS. 17A to 18D show the results of the simulation of the system set in a case that the controlled vehicle VE having the relative speed of 20 km/h approaches the preceding vehicle cruising 120 m ahead. FIGS. 17A to 17D show the result in case of the first setting ①. FIGS. 18A to 18D show the result in case of the second setting ②. In each graph showing the change of the vehicle speed V, a continuous line represents the vehicle speed V, and a broken line represents the target vehicle speed V*. In each graph showing the change of the vehicle-to-vehicle distance, a continuous line represents the vehicle-to-vehicle distance L, and a broken line represents the target vehicle-to-vehicle distance L*. In each graph showing the change of the relative speed, a continuous line represents the relative speed $\Delta V$, and a broken line represents the calculated relative speed $\Delta Vs$. In each graph showing the acceleration of the vehicle, a continuous line represents the acceleration and deceleration of the vehicle.

In case that the controlled vehicle approaches the preceding vehicle, if the first setting ① having a late convergence characteristic is selected, the control of the vehicle-to-vehicle distance L is started at the timing that the vehicle-to-vehicle distance L is long so as to slowly converge the vehicle-to-vehicle distance L to the target vehicle-to-vehicle distance L*. During this control, the maximum deceleration of the controlled vehicle is at most 0.5 m/ss. On the other hand, if the second setting ② having a quick convergence characteristic is selected, the control of the vehicle-to-vehicle distance L is started at the timing that the vehicle-to-vehicle distance L becomes short in some degree so as to quickly converge the vehicle-to-vehicle distance L to the target vehicle-to-vehicle distance L*. During this quick response control, the maximum deceleration of the controlled vehicle is at most 1.0 m/ss and becomes larger than that of the rate pole setting.

FIGS. 19A to 20D show the results of the simulation of the system set in a case that when the controlled vehicle cruising at 100 km/h vehicle speed follows up a preceding vehicle cruising with the vehicle-to-vehicle distance of 40 m, a vehicle having the relative speed of 15 km/h cuts in a position 30 m ahead of the controlled vehicle. FIGS. 19A to 19D show the result in case of the first setting ①, and FIGS. 20A to 20D shows the result in case of the second setting ②. In each graph showing the change of the vehicle speed V, a continuous line represents the vehicle speed V and a broken line represents the target vehicle speed V*. In each graph showing the vehicle-to-vehicle distance, a continuous line represents the vehicle-to-vehicle distance L, and a broken line represents the target vehicle-to-vehicle distance L*. In each graph showing the relative speed, a continuous line represents the relative speed ΔV, and a broken line represents the relative speed calculated value ΔVs. In each graph showing the acceleration of the vehicle, a continuous line represents the acceleration and deceleration of the vehicle.

In case that a vehicle cuts in a position ahead of the controlled vehicle as shown in FIGS. 19A to 19D, if the second setting ② is selected, the controlled vehicle is quickly decelerated and therefore the minimum vehicle-to-vehicle distance is about 25 m. That is, the approaching to the cut-in vehicle is small. On the other hand, if the first setting ① is selected, the controlled vehicle VE approaches the cut-in vehicle to decrease the vehicle-to-vehicle distance L at 20 m, and then the vehicle-to-vehicle distance L is converged to the target vehicle-to-vehicle distance L*.

Thus, the case of the approaching from a far place and the case of the cut-in during the follow-up require different response characteristics, respectively. Therefore, it is difficult for one response characteristic to satisfy the both responsibilities.

Therefore, the second embodiment of the preceding vehicle follow-up control apparatus according to the present invention is arranged so as to overcome the above mentioned difficulties of the response characteristic by paying attention to the vehicle-to-vehicle distance during the control. That is, the pole and the first and second gains fd and fv are determined such that the responsibility of the total system has a slow convergence characteristic employed in a case that the vehicle-to-vehicle distance is long and a quick convergence characteristic employed in a case that the vehicle-to-vehicle distance L is short. That is, the first and second gains fd and fv are changed according to the vehicle-to-vehicle distance L.

Figure 21:
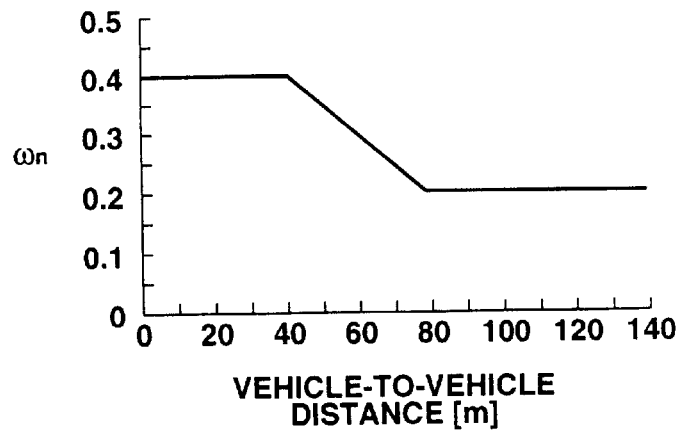
FIG. 21 is a graph showing a setting example of $\omega_n$ with respect to the vehicle-to-vehicle distance.
Figure 22A:
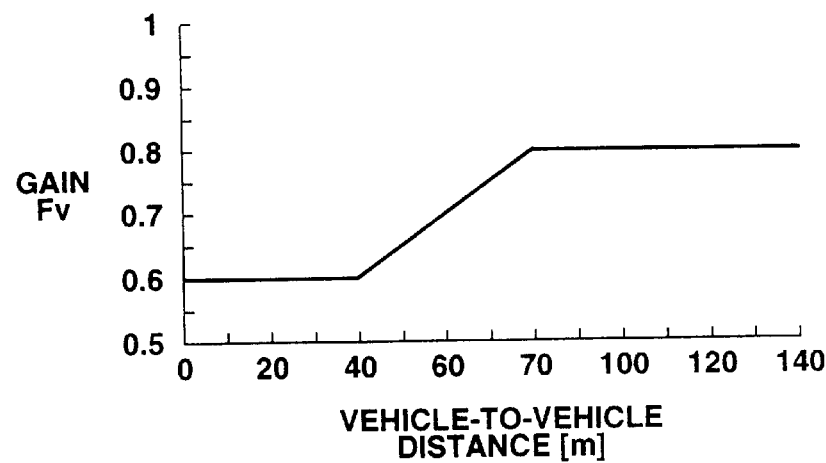
FIGS. 22A and 22B are graphs showing relationships of first and second gains with respect to the vehicle-to-vehicle distance of the second embodiment according to the present invention.
Figure 22B:
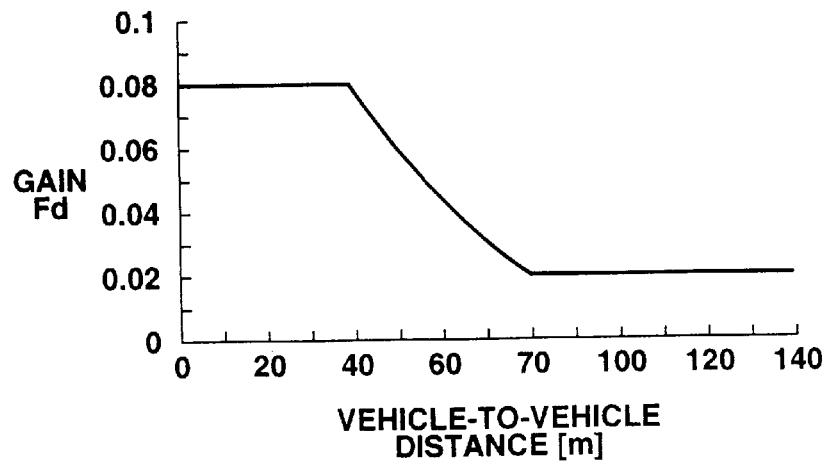
Figure 23A:
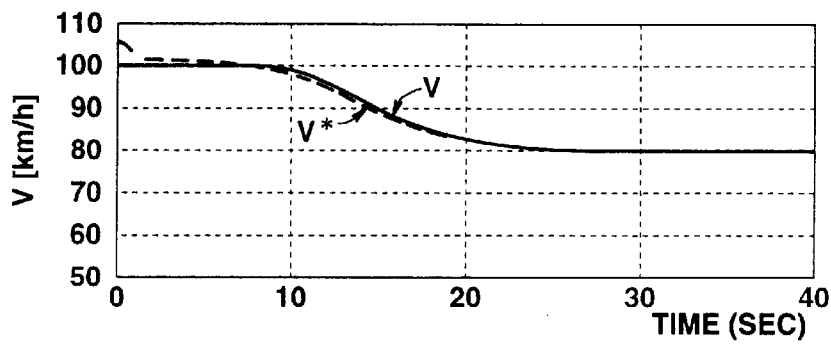
FIGS. 23A to 23D are graphs showing a result of a simulation of the second embodiment.
Figure 23B:
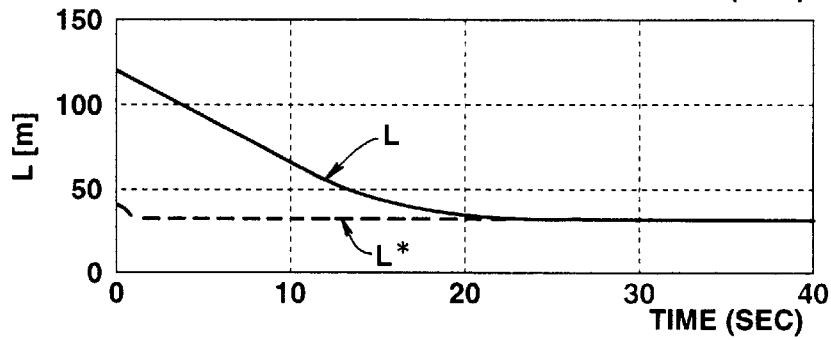
Figure 23C:
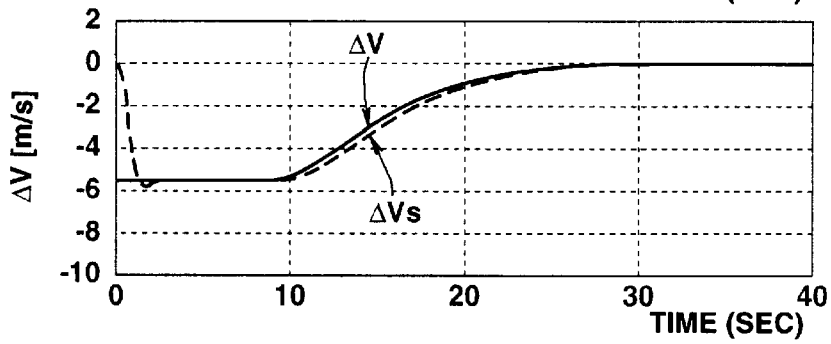
Figure 23D:
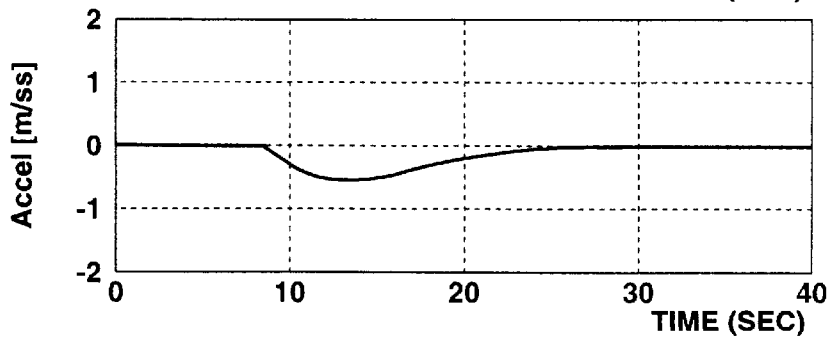
Figure 24A:
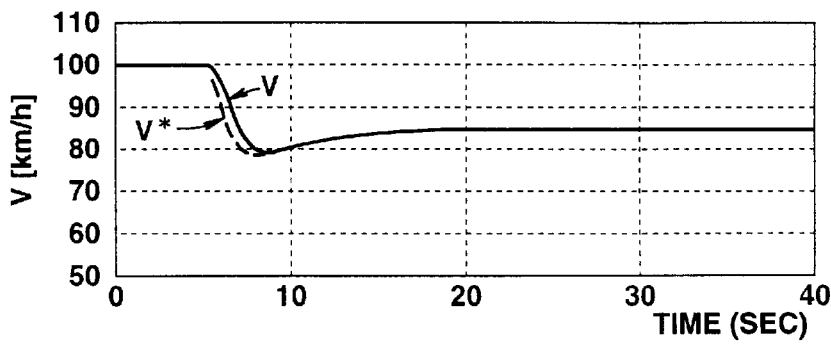
FIGS. 24A to 24D are graphs showing a result of a simulation of the second embodiment.
Figure 24B:
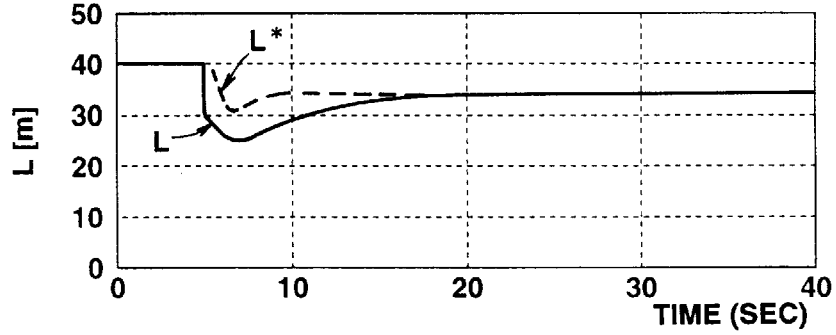
Figure 24C:
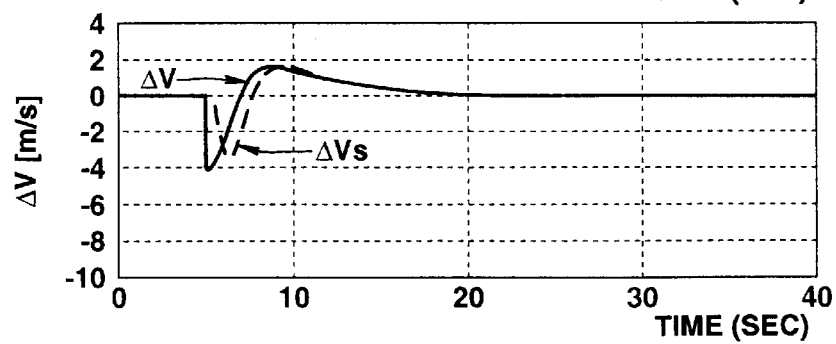
Figure 24D:
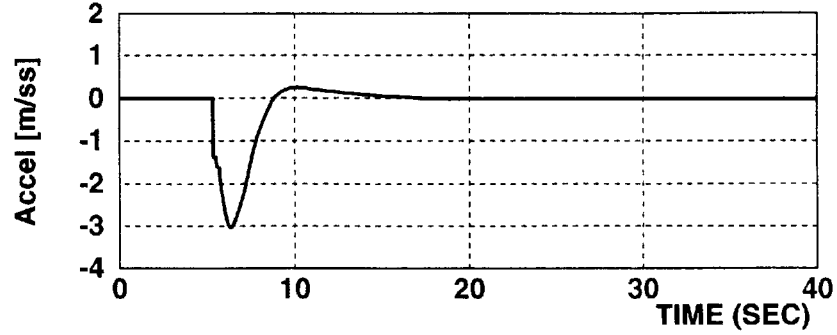

This gain changing method for changing the first and second gains fd and fv on the basis of the vehicle-to-vehicle distance L will be discussed. As mentioned above, since the response characteristic of the control system is approximated by the secondary system, $\omega_n$ is set with respect to the vehicle-to-vehicle distance L, for example, as shown in FIG. 21. When the vehicle-to-vehicle distance L is shorter than 40 m, $\omega_n$ is set at 0.4 to ensure quick response. When the vehicle-to-vehicle distance is longer than 80 m, $\omega_n$ is set at 0.2 to ensure slow response. Further, when the vehicle-to-vehicle distance L ranges within 40 m to 80 m, the first and second gains fd and fv are interpolated so as to smoothly switch the first and second gains fd and fv. The calculation result of each gain fd, fv on the basis of the $\omega_n$ is shown in FIGS. 22A and 22B. As shown in FIGS. 22A and 22B, when the vehicle-to-vehicle distance L is long, the first gain fd to be multiplied with the vehicle-to-vehicle distance difference ΔL is decreased and the second gain fv to be multiplied with the relative speed ΔV is increased. In reverse, when the vehicle-to-vehicle distance L is short, the first gain fd to be multiplied with the vehicle-to-vehicle distance difference ΔL is increased and the second gain fv to be multiplied with the relative speed ΔV is decreased.

FIGS. 23A to 23D show the result of the simulation of the system set in a case that the controlled vehicle VE having the relative speed of 20 km/h approaches the preceding vehicle cruising 120 m ahead. FIG. 23A to 23D show the results of the simulation of the system set in a case that when the controlled vehicle cruising at 100 km/h vehicle speed follows up a preceding vehicle cruising with the vehicle-to-vehicle distance L of 40 m, a vehicle having the relative speed ΔV of 15 km/h cuts in a position 30 m ahead of the controlled vehicle. In a graph showing the vehicle speed, a continuous line represents the vehicle speed V, and a broken line represents the target vehicle speed V*. In a graph shown the vehicle-to-vehicle distance, a continuous line represents the vehicle-to-vehicle distance L, and a broken line presents the target vehicle-to-vehicle distance L*. In a graph showing the relative speed, a continuous line represents the relative speed ΔV, and a broken line represents the relative speed estimated value ΔVs. In a graph showing the acceleration of the vehicle, a continuous line represents the acceleration and deceleration of the vehicle.

As shown in FIGS. 23A to 23D, in case that the controlled vehicle approaches the preceding vehicle from a far place, the slow response characteristic is employed. Therefore, after the catch up of the preceding vehicle, the controlled vehicle starts to deceleration so as to slowly converge the vehicle-to-vehicle distance L to the target vehicle-to-vehicle distance L* when the vehicle-to-vehicle distance L is 70 m. Certainly, the deceleration of-the vehicle is small, and therefore the impact applied to a vehicular occupant becomes small.

Further, as shown in FIGS. 24A to 24D, since the vehicle-to-vehicle distance during the follow-up is 40 m; the quick response characteristic is employed. Accordingly, the deceleration is started just after the trusting-in, and therefore the over approach with the preceding vehicle is prevented and the vehicle-to-vehicle distance L is quickly converged into the target vehicle-to-vehicle distance L*.

Thus, by quickly responding to a case that the vehicle-to-vehicle distance L is short such as the cut-in of other vehicle during the follow-up, and by slowly responding to a case that the controlled vehicle VE approaches a distant preceding vehicle, the characteristic fitted with the vehicular occupant feeling is ensured.

The above mentioned embodiment has been shown and described to have an automatic brake control executed by the braking apparatus 6 such that the actual vehicle speed follows every vehicle speed command value, that is, the deceleration of the vehicle VE is idealistically realized. However, in case that such automatic brake control is not employed, some required deceleration cannot be achieved only by an engine brake. Therefore, the controlled vehicle may overly approach the preceding vehicle. That is, if the controlled vehicle VE does not equip the automatic brake control, it is impossible to fix the first and second gains fv and fd as conventionally. Therefore, by changing the first and second gains fv and fd according to the vehicle-to-vehicle distance, optimum response characteristic is always ensured.

Although the above mentioned embodiment has been shown and described to employ the gain scheduling, it will be understood that the gains may be changed into two-steps or several steps according to the vehicle-to-vehicle distance.

In the construction of the embodiment, the vehicle-to-vehicle distance sensor head 1 and the signal processing section 11 constitute vehicle-to-vehicle distance detecting means, the relative speed calculating section 501 constitutes relative speed detecting means, the target vehicle-to-vehicle distance setting section and the vehicle-to-vehicle distance control section constitute vehicle speed calculating means and gain changing means, the vehicle speed sensor 2 and the vehicle speed signal processing section 21 constitute a controlled vehicle speed detecting means, and the vehicle speed control section 51 constitutes vehicle speed controlling means.

According to the second embodiment of the preceding vehicle follow-up control apparatus according to the present invention, since the first and second gains for calculating the target vehicle speed are changed according to the vehicle-to-vehicle distance, it is possible for the preceding vehicle follow-up control apparatus according to the present invention to perform an optimum response characteristic even in any situations.

Although the preferred embodiments have been shown and described-such that the radar type vehicle-to-vehicle distance sensor head 1 measures the vehicle-to-vehicle distance L, it will be understood that the vehicle-to-vehicle distance L may be measured by a device employing electric wave or ultrasonic wave.

What is claimed is:

1. A preceding vehicle follow-up control apparatus for a vehicle comprising:

vehicle speed detecting means for detecting a vehicle speed of the controlled vehicle;

vehicle-to-vehicle distance detecting means for detecting a vehicle-to-vehicle distance between the controlled vehicle and a preceding vehicle cruising ahead of the controlled vehicle;

relative speed calculating means for obtaining a relative speed between the controlled vehicle and the preceding vehicle;

target speed calculating means for calculating a target vehicle speed which is employed to adjust the vehicle-to-vehicle distance at a target vehicle-to-vehicle distance, said target speed calculating means calculating the target vehicle speed by employing a form which includes a linear connection between a product of a first gain and a difference between the vehicle-to-vehicle distance and the target vehicle-to-vehicle distance and a product of a second gain and the relative speed; and vehicle speed control means for controlling driving power of the controlled vehicle to adjust the detected vehicle speed to the target vehicle speed.

2. A preceding vehicle follow-up control apparatus as claimed in claim 1, further comprising gain changing means for changing the first and second gains according to the vehicle-to-vehicle distance.

3. A preceding vehicle follow-up control apparatus as claimed in claim 1, wherein said target speed calculating means calculates a vehicle speed of the preceding vehicle by adding the obtained relative speed with the vehicle speed of the controlled vehicle, said target speed calculating means calculating a target relative speed by adding the product of the first gain and the difference between the detected vehicle-to-vehicle distance and the target vehicle-to-vehicle distance and the product of the second gain and the detected relative speed, said target speed calculating means calculating the target vehicle speed by subtracting the target relative speed from the preceding-vehicle vehicle speed.

4. A preceding vehicle follow-up control apparatus as claimed in claim 1, wherein the first and second gains are determined such that the detected vehicle-to-vehicle distance is converged to the target vehicle-to-vehicle distance and the detected relative speed is converged to 0 on the basis of the a linear transfer function which is of an approximation of a vehicle speed system of said vehicle speed control means.

5. A preceding vehicle follow-up control apparatus as claimed in claim 1, wherein said relative speed calculating means obtains the relative speed by applying one of a band-pass filter and a high-pass filter to the detected vehicle-to-vehicle distance.

6. A preceding vehicle follow-up control apparatus as claimed in claim 1, wherein the target vehicle-to-vehicle distance is determined according to the vehicle speed of the preceding vehicle.

7. A preceding vehicle follow-up control apparatus as claimed in claim 1, wherein the target vehicle-to-vehicle distance is determined according to the vehicle speed of the controlled vehicle.

8. A preceding vehicle follow-up control apparatus as claimed in claim 2, wherein said gain changing means decreases the first gain and increases the second gain when the detected vehicle-to-vehicle distance is longer than a first predetermined distance, and said gain changing means increased the first gain and decreases the second gain when the detected vehicle-to-vehicle distance is shorter than a second predetermined distance.

9. A preceding vehicle follow-up control apparatus as claimed in claim 2, wherein a preceding vehicle follow-up control system is constructed by approximating a vehicle speed control system by a linear transfer function, wherein the first and second gains are determined such that the convergence characteristic for converging the vehicle-to-vehicle distance to the target vehicle distance and for converging the calculated relative speed to zero.

10. A preceding vehicle follow-up control apparatus as claimed in claim 9, wherein the first and second gains are determined by employing a characteristic frequency of the transfer function of a preceding vehicle follow-up control system as a function of a detected vehicle-to-vehicle distance.

11. A preceding vehicle follow-up control apparatus for a vehicle comprising:

a vehicle speed detector detecting a vehicle speed of the controlled vehicle;

a vehicle-to-vehicle distance detector detecting a vehicle-to-vehicle distance between the controlled vehicle and a preceding vehicle cruising ahead of the controlled vehicle;

a control unit arranged to calculate a relative speed between the controlled vehicle and the preceding vehicle, to calculate a target vehicle speed which is employed to adjust the vehicle-to-vehicle distance at a target vehicle-to-vehicle distance, to calculate the target vehicle speed by employing a form which includes a linear connection between a product of a first gain and a difference between the vehicle-to-vehicle distance and the target vehicle-to-vehicle distance and a product of a second gain and the relative speed, and to control driving power of the controlled vehicle to adjust the detected vehicle speed to the target vehicle speed.

12. A preceding vehicle follow-up control apparatus, as claimed in claim 11 wherein said control unit changes the first and second gains according to the detected vehicle-to-vehicle distance.

13. A preceding vehicle follow-up control apparatus as claimed in claim 11, wherein said control unit is arranged to calculate a vehicle speed of the preceding vehicle by adding the obtained relative speed with the vehicle speed of the controlled vehicle, to calculate a target relative speed by adding the product of the first gain and a difference between the detected vehicle-to-vehicle distance and the target vehicle-to-vehicle distance and the product of the second gain and the detected relative speed, and to calculate the target vehicle speed by subtracting the target relative speed from the preceding-vehicle vehicle speed.

14. A preceding vehicle follow-up control apparatus as claimed in claim 11, wherein said control unit calculates the target vehicle speed from the following equation:

$$V^* = V - fd(L^* - L) + (1 - fv)\Delta V$$

where V* is the target vehicle speed, V is the vehicle speed of the controlled vehicle, L is the vehicle-to-vehicle distance, L* is the target vehicle-to-vehicle distance, ΔV is the relative speed, fd is the first gain and fv is the second gain.

15. A preceding vehicle follow-up control apparatus as claimed in claim 11, wherein said control unit decreases the first gain and increases the second gain when the detected vehicle-to-vehicle distance is longer than a first predetermined distance, and said control unit increases the first gain and decreases the second gain when the detected vehicle-to-vehicle distance is shorter than a second predetermined distance.

* * * * *